United States Patent
Xiao et al.

(10) Patent No.: US 8,526,513 B2
(45) Date of Patent: Sep. 3, 2013

(54) METHOD AND APPARATUS FOR TRANSMITTING DATA, AND COMMUNICATION SYSTEM

(75) Inventors: Ruijie Xiao, Shenzhen (CN); Matthew Leung, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 13/302,855

(22) Filed: Nov. 22, 2011

(65) Prior Publication Data

US 2012/0063526 A1 Mar. 15, 2012

Related U.S. Application Data

(63) Continuation of application No. PCT/CN2010/073066, filed on May 21, 2010.

(30) Foreign Application Priority Data

May 22, 2009 (CN) .......................... 2009 1 0202946

(51) Int. Cl.
 *H04B 3/54* (2006.01)
(52) U.S. Cl.
 USPC .......................................................... 375/259
(58) Field of Classification Search
 USPC ................ 370/229, 352, 384, 401, 468, 503;
 375/224, 257, 259, 260, 295, 343; 714/748, 714/776
 See application file for complete search history.

(56) References Cited

U.S. PATENT DOCUMENTS

| | | | |
|---|---|---|---|
| 6,856,628 B1 * | 2/2005 | Bychowsky et al. | 370/412 |
| 7,120,113 B1 * | 10/2006 | Zhang et al. | 370/229 |
| 2005/0071733 A1 * | 3/2005 | Fukae et al. | 714/776 |
| 2007/0033496 A1 | 2/2007 | Cooklev et al. | |

(Continued)

FOREIGN PATENT DOCUMENTS

| | | |
|---|---|---|
| CN | 1352862 A | 6/2002 |
| CN | 1536820 A | 10/2004 |

(Continued)

OTHER PUBLICATIONS

International Search Report in corresponding PCT Application No. PCT/CN2010/073066 (Sep. 2, 2010).

(Continued)

*Primary Examiner* — Sam K Ahn
*Assistant Examiner* — Shawkat M Ali
(74) *Attorney, Agent, or Firm* — Leydig, Voit & Mayer, Ltd.

(57) ABSTRACT

The present invention discloses a method for transmitting data. In the embodiments of the present invention, whether to send blocking information used to block low priority data sent by an upper layer is determined through monitoring a delay of data during transmission, so as to prevent data overflow in a retransmission buffer of the sending end, thus achieving higher INP protection for the low priority data. Meanwhile, only the low priority data is blocked at this time, therefore, a sending end may further continue receiving high priority data, and mark the high priority data with a flag indicating retransmission is not needed when encapsulating the high priority data, so that a receiving end does not apply for retransmission of the high priority data when receiving the high priority data, thus ensuring the short delay requirement of the high priority data.

9 Claims, 11 Drawing Sheets

(56) References Cited

U.S. PATENT DOCUMENTS

| | | | |
|---|---|---|---|
| 2007/0079207 A1* | 4/2007 | Seidel et al. | 714/748 |
| 2008/0063007 A1* | 3/2008 | Christiaens et al. | 370/458 |
| 2009/0177938 A1* | 7/2009 | Pons et al. | 714/751 |

FOREIGN PATENT DOCUMENTS

| | | |
|---|---|---|
| CN | 101155014 A | 4/2008 |
| CN | 101321046 A | 12/2008 |
| EP | 1507352 A1 | 2/2005 |

OTHER PUBLICATIONS

1st Office Action in corresponding Chinese Patent Application No. 200910202946.5 (Jul. 20, 2012).

Written Opinion of the International Searching Authority in corresponding PCT Application No. PCT/CN2010/073066 (Sep. 2, 2010).

"Temporary Document 08CC-063R1—Updated Protocol for a retransmission technique below the gamma layer with support for the ATM-TC," Study Group 15, Apr. 15-19, 2008, International Telecommunication Union, Campbell, California.

"Temporary Document 08CC-064R2—G.inp: Retransmission over PTM-TC: operation on a single link (update to 08AB-046)," Study Group 15, Sep. 15-19, 2008, International Telecommunication Union, Campbell, California.

Extended European Search Report in corresponding European Patent Application No. 10777387.1 (Jun. 22, 2012).

2nd Office Action in corresponding Chinese Patent Application No. 200910202946.5 (Mar. 6, 2013).

* cited by examiner

METHOD AND APPARATUS FOR TRANSMITTING DATA, AND COMMUNICATION SYSTEM

CROSS-REFERENCE TO RELATED APPLICATIONS

This application is a continuation of International Application No. PCT/CN2010/073066, filed on May 21, 2010, which claims priority to Chinese Patent Application No. 200910200946.5, filed on May 22, 2009, both of which are hereby incorporated by reference in their entireties.

FIELD OF THE INVENTION

The present invention relates to the field of communications technologies, and in particular, to a method and an apparatus for transmitting data and a communication system.

BACKGROUND OF THE INVENTION

In an original digital subscriber line (DSL) system, bit errors of data in a line often occur because of influence of impulse noises. In order to ensure the stability of a DSL system, an impulse noise protection (INP, Impulse noise protection) technology is developed. The INP technology mainly uses an error correcting code to correct bit errors generated in sent data, for example, a coding gain additionally provided by Reed-Solomon (RS, Reed-Solomon) codes is used to reduce the influence of the impulse noises, thus increasing the stability of the DSL system. However, with the increasing of a bandwidth and the increasing of a rate, if an original RS coding scheme is still used, an RS code word with many check bytes (that is, redundancy) and shorter length needs to be used. In this case, a net gain of the RS code changes into a negative value, which is not conducive to the increase of the rate, and the INP protection provided by the system cannot deal with the influence of a super long impulse noise.

In order to better deal with the influence of the super long impulse noise on an xDSL system, a physical layer retransmission scheme is developed. The current retransmission scheme includes retransmission mechanisms of a transport protocol specific transmission convergence layer (TPS-TC, Transport Protocol Specific Transmission Convergence Layer), a physical media-specific transmission convergence layer (PMS-TC, Physical Media-Specific Transmission Convergence Layer), and a physical media dependent layer (PMD, Physical Media Dependent Layer). The retransmission scheme can re-send the data damaged by the impulse noise, thus reducing a bit error rate in the line and increasing the service stability.

During the research and implementation of the prior art, the inventor of the present invention finds that: the retransmission scheme alleviates the influence of the super long impulse noise on the system to a certain extent and improves the service stability of the system, but meanwhile, incurs a long delay (Delay). For example, in a retransmission system located on the PMS-TC layer, an additionally incurred delay is longer than about 10 ms, and a maximum data delay is even longer than 20 ms. This delay has little influence on a service having a high requirement on the bit error rate and a low requirement on the delay. However, for a service having a low requirement on the bit error rate and a high requirement on the delay, the quality of experience (QoE, Quality of experience) of a user is greatly deteriorated.

SUMMARY OF THE INVENTION

Embodiments of the present invention provide a method and an apparatus for transmitting data and a communication system, so as to satisfy different delay requirements of different services and different INP protection level requirements of different services.

A method for transmitting data includes:
monitoring a delay of data during transmission;
if the delay is greater than a first delay threshold value, sending blocking information, where the blocking information is used to block low priority data sent by an upper layer;
receiving high priority data sent by the upper layer;
encapsulating the high priority data into a data unit, and marking the data unit with a flag indicating that retransmission is not needed; and
sending the data unit to a receiving end.

A method for transmitting data includes:
receiving a data unit sent by a sending end;
when it is determined that the data unit includes a flag indicating that retransmission is not needed, saving the data unit in a retransmission buffer of the receiving end;
when it is determined that the data unit does not include the flag indicating that the retransmission is not needed, judging whether the data unit is a new data unit;
if the data unit is the new data unit, saving the data unit in the retransmission buffer of the receiving end; and
if the data unit is not the new data unit, judging whether the data unit is incorrect; if the data unit is incorrect, discarding the data unit; if the data unit is not incorrect, further judging whether the data unit times out; if the data unit times out, discarding the data unit; and if the data unit does not time out, saving the data unit in the retransmission buffer of the receiving end.

A sending end device includes:
a monitoring unit, configured to monitor a delay of data during transmission;
a blocking information sending unit, configured to: when the monitoring unit determines that the delay is greater than a first delay threshold value, send blocking information, where the blocking information is used to block low priority data sent by an upper layer;
a receiving unit, configured to receive high priority data sent by the upper layer;
an encapsulation unit, configured to encapsulate the high priority data received by the receiving unit into a data unit and mark the data unit with a flag indicating that retransmission is not needed; and
a sending unit, configured to send the data unit encapsulated by the encapsulation unit to a receiving end.

A communication system includes:
a sending end device, configured to monitor a delay of data during transmission; if the delay is greater than a first delay threshold value, send blocking information used to block low priority data sent by an upper layer; receive high priority data sent by the upper layer; encapsulate the high priority data into a data unit; mark the data unit with a flag indicating that retransmission is not needed; and send the data unit to a receiving end device; and
the receiving end device, configured to receive the data unit sent by the sending end device; and when it is determined that the data unit includes the flag indicating that the retransmission is not needed, save the data unit in a retransmission buffer of the receiving end.

In the embodiments of the present invention, the delay of the data during the transmission is monitored to determine whether to send the blocking information used to block the low priority data sent by the upper layer, so as to prevent a data overflow in a retransmission buffer of the sending end, thus achieving higher INP protection for the low priority data.

Meanwhile, only the low priority data is blocked at this time, therefore, the sending end may still continue receiving the high priority data, and marks the high priority data with the flag indicating that the retransmission is not needed when encapsulating the high priority data, so that the receiving end does not apply for the retransmission of the high priority data when receiving the high priority data, thus ensuring the short delay requirement of the high priority data. That is to say, by using the embodiments of the present invention, different delay requirements of different services and different INP protection level requirements of different services may be satisfied, and the QoE of integrated services for a user is improved.

DETAILED DESCRIPTION OF THE EMBODIMENTS

The technical solutions in the embodiments of the present invention are clearly and completely described below with reference to the accompanying drawings in the embodiments of the present invention. It is obvious that the embodiments to be described are only part of rather than all of the embodiments of the present invention. All other embodiments obtained by persons of ordinary skill in the art based on the embodiments of the present invention without creative efforts shall fall within the protection scope of the present invention.

The embodiments of the present invention provide a method for transmitting data. The embodiments of the present invention further provide a corresponding apparatus and communication system. Details are described below respectively.

Embodiment 1

This embodiment is described from the perspective of a sending end.

Figure 1:
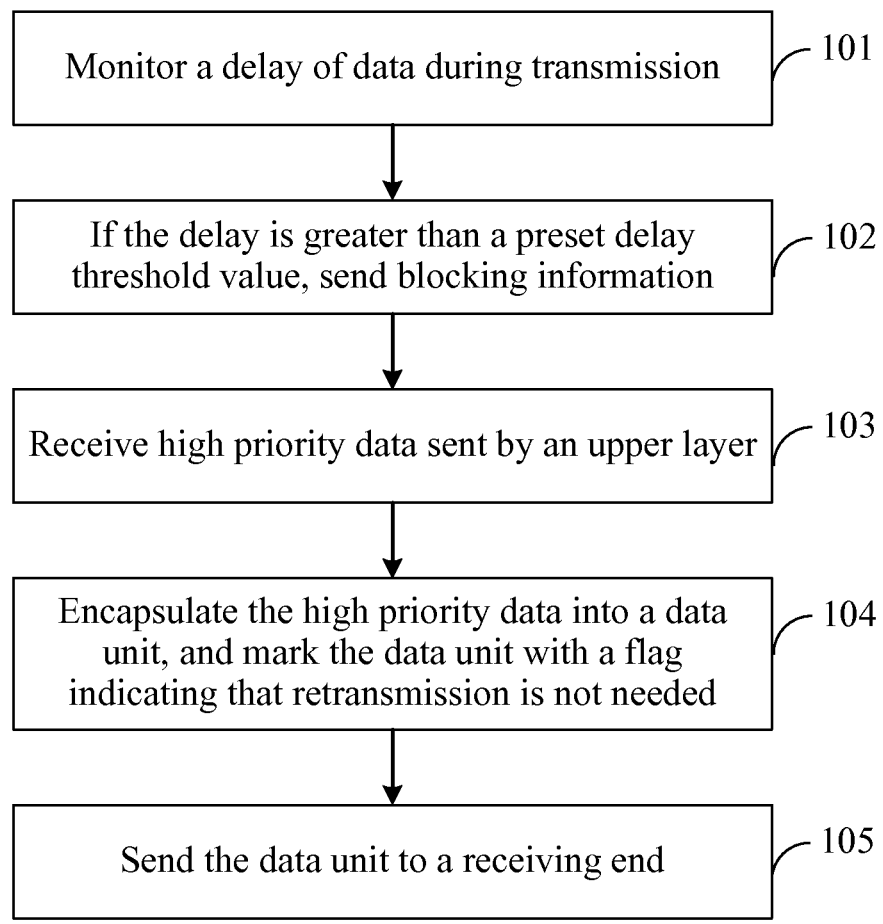
FIG. 1 is a flow chart of a method according to a first embodiment of the present invention.

A method for transmitting data includes: monitoring a delay of data during transmission; if the delay is smaller than or equal to a first delay threshold value, performing processing according to an existing scheme; if the delay is greater than the first delay threshold value, sending blocking information used to block low priority data sent by an upper layer, receiving only high priority data sent by the upper layer at this time because the low priority data is blocked by the blocking information, after receiving the high priority data encapsulating the high priority data into a data unit, marking the data unit with a flag indicating that retransmission is not needed, and sending the data unit to a receiving end, so that the receiving end does not apply for retransmission of the data unit after receiving the data unit marked with the flag indicating that the retransmission is not needed. The first delay threshold value may be preset or may be set through self-adjustment during operation of a system. For convenience of description, in the embodiments of the present invention, illustration is provided by taking that the first delay threshold value is always preset as an example. As shown in FIG. 1, a specific flow may be as follows.

101: Monitor a delay of data during transmission; if the delay is smaller than or equal to a preset delay threshold value, perform processing according to an existing scheme; if the delay is greater than the preset delay threshold value, execute step 102.

Specifically, the delay of the data during the transmission may be monitored by monitoring a storage status of space in a retransmission buffer of the sending end. For example, it is determined whether an amount of data saved in the retransmission buffer of the sending end is greater than a preset threshold value; if the amount of the data saved in the retransmission buffer of the sending end is greater than the preset threshold value, it indicates that the delay is greater than the preset threshold value; and if the amount of the data saved in the retransmission buffer of the sending end is not greater than the preset threshold value, it indicates that the delay is not greater than the preset threshold value.

102: Send blocking information, where the blocking information is used to block low priority data sent by an upper layer (that is, an upper layer of a TPS-TC layer), and may specifically be a hardware blocking signal, blocking data, or a blocking flag.

The reason is as follows. If the low priority data continues being received at this time, the space of the retransmission buffer of the sending end is insufficient, that is, data overflow may occur. If it happens that the overflowed data is not correctly received by a receiving end, retransmission cannot be performed at this time (because the data is not saved in the retransmission buffer of the sending end), so the data is incorrect or lost, that is, an INP protection function cannot be realized. Therefore, in the embodiment of the present invention, when it is determined that the space of the retransmission buffer of the sending end is full, the blocking information is sent to temporarily stop receiving the low priority data, so as to ensure realization of a high INP protection level for the low priority data.

It should be noted that, a data priority may be preset by an operator. For example, if a service, such as, a Voice over Internet Protocol (VoIP, Voice over IP) or a real-time video call, is sensitive to the delay but has no requirement on a bit error rate, service data of the service may be set to high priority (High priority) data. If a service, such as a video service, is insensitive to the delay and requires a low bit error rate, service data of the service may be set to low priority (Low Priority) data.

103: Receive high priority data sent by the upper layer, that is, the upper layer of the TPS-TC layer.

The low priority data is blocked in step 102, so only the high priority data sent by the upper layer can be received at this time. That is to say, the low priority data being insensitive to the delay but requiring the low bit error rate is temporarily stopped from being received at this time. For the purpose of ensuring a short delay requirement of the high priority data being sensitive to the delay but having no requirement on the bit error rate, normal receiving of the high priority data is still kept. However at this time, after the received high priority data is encapsulated into a data unit, the data unit is not saved in the retransmission buffer of the sending end. Instead, after the data unit is marked with a flag indicating retransmission is not needed (referring to step 104), the data unit is directly transmitted to the receiving end. In this way, the short delay requirement of the high priority data is ensured, and meanwhile, the possible data overflow described in step 102 does not occur.

104: Encapsulate the high priority data into the data unit, and mark the data unit with a flag indicating that retransmission is not needed.

The flag indicating that the retransmission is not needed may specifically be a special sequence identifier (SID, Sequence Identifier), for example, 255, or may also be another SID negotiated by a sending end and the receiving end, or may also be marked by using an independent additional flag (Flag) in the data unit.

It should be noted that, if the high priority data is not received in step 103 or the received high priority data is insufficient, for the purpose of ensuring continuity of the data transmission between the sending end and the receiving end, idle (IDLE) data may also be encapsulated into a data unit at this time, and after the data unit is marked with the flag indicating that the retransmission is not needed, the data unit is sent to the receiving end. That is to say, the data unit having the flag indicating that the retransmission is not needed is only used to bear the high priority data and the idle data. Moreover, the data unit having the flag indicating that the retransmission is not needed is not buffered into the retransmission buffer of the sending end (referring to the description of step 103), and meanwhile, the receiving end does not apply for retransmission of this type of data unit. Data borne in the data unit having the flag indicating that the retransmission is not needed is not retransmitted, so a higher bit error rate of the transmitted data may occur, but from another perspective, a shorter delay may be achieved. Furthermore, it should also be noted that, the high priority data and the idle data may be encapsulated separately or encapsulated in the same data unit, that is, the data unit may include the high priority data and the idle data or may only include either the high priority data or the idle data.

105: Send the data unit to the receiving end, where the data unit includes service type information and SID information of the data unit, so that the receiving end may perform processing according to the information after receiving the data unit.

It should be noted that, the service type information and the SID information of the data unit may be marked by multiplexing information in the same field in the data unit or marked by using different fields of the data unit.

It can be known from the foregoing that, in the embodiment of the present invention, the delay of the data during the transmission is monitored to determine whether to send the blocking information used to block the low priority data sent by the upper layer, so as to prevent the data overflow in the retransmission buffer of the sending end, thus achieving higher INP protection for the low priority data. Meanwhile, because only the low priority data is blocked at this time, the sending end may also continue receiving the high priority data, and marks the high priority data with the flag indicating that the retransmission is not needed when encapsulating the high priority data, so that the receiving end does not apply for the retransmission of the high priority data when receiving the high priority data, thus ensuring the short delay requirement of the high priority data. That is to say, by using the embodiment of the present invention, different delay requirements of different services and different INP protection level requirements of different services may be satisfied, and the QoE of integrated services for a user is improved. For example, for a service that is sensitive to the delay but has no requirement on the bit error rate, a lower INP protection level may be adopted, and the retransmission is not performed when the delay exceeds a certain delay threshold value; for a service that is insensitive to the delay but requires the low bit error rate, the higher INP protection level may be adopted, and the retransmission is needed.

Embodiment 2

This embodiment is described from the perspective of a receiving end.

A method for transmitting data includes: receiving a data unit sent by a sending end, and when it is determined that the data unit includes a flag indicating that retransmission is not needed, saving the data unit in a retransmission buffer of the receiving end. This is to say, it is not needed to judge whether the data unit is correct or needs to be retransmitted, and instead, the data unit is directly saved in the retransmission buffer of the receiving end. In this way, the number of retransmission applications of the receiving end and a delay of this type of data unit (that is, the data unit including the flag indicating that the retransmission is not needed) may be reduced.

Figure 2:
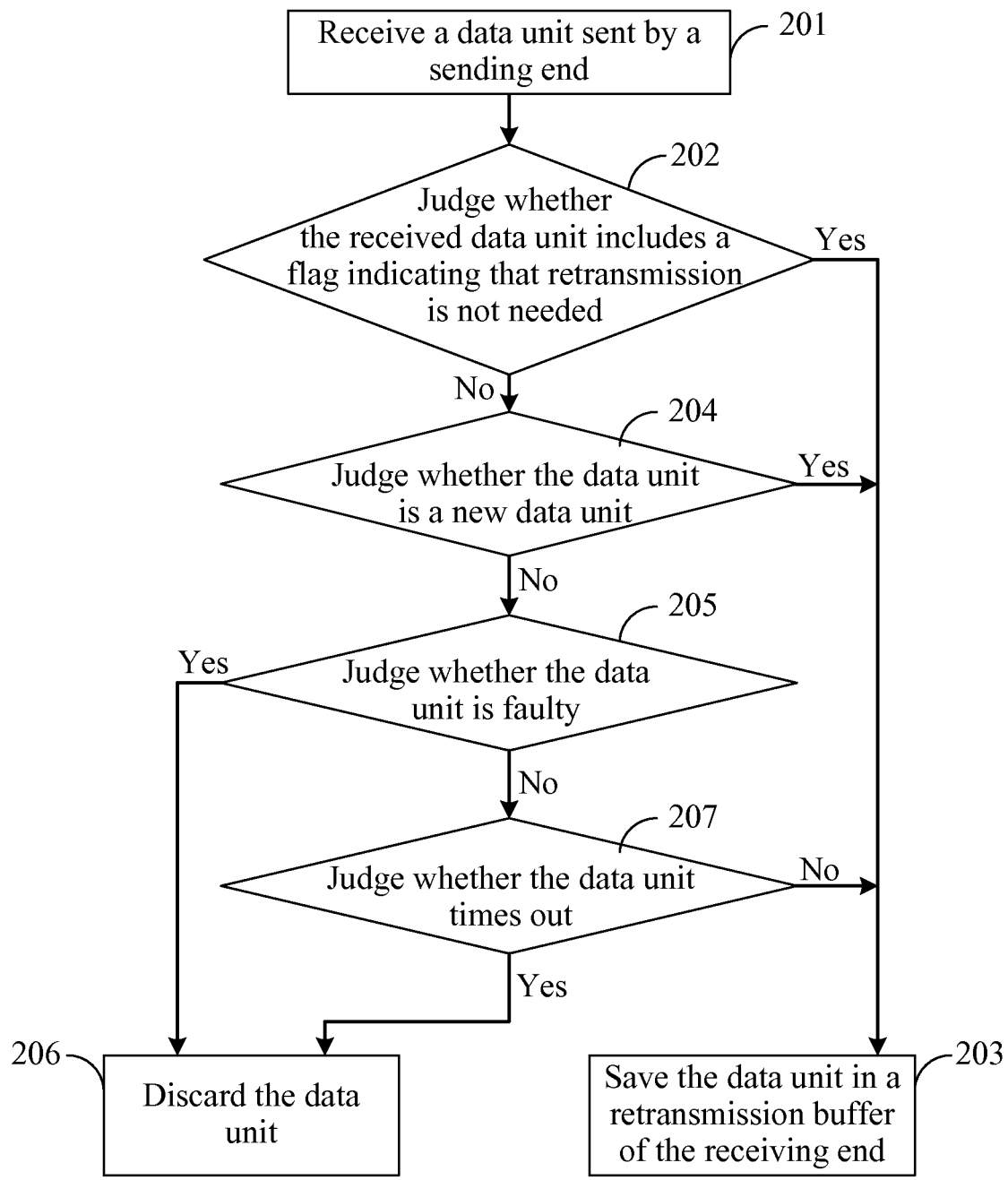
FIG. 2 is a flow chart of a method according to a second embodiment of the present invention.

Furthermore, if it is determined that the data unit does not include the flag indicating that the retransmission is not needed, certain processing is required to be performed on the data unit before it is determined whether to save the data unit in the retransmission buffer of the receiving end. Referring to FIG. 2, a brief description of a flow is given below.

201: Receive a data unit sent by a sending end.

202: Judge whether the received data unit includes a flag indicating that retransmission is not needed; if the received data unit includes the flag indicating that the retransmission is not needed, execute step 203; if the received data unit does not include the flag indicating that the retransmission is not needed, execute step 204.

The flag indicating that the retransmission is not needed may specifically be a special SID, for example, 255, or may also be another SID negotiated by the sending end and a receiving end, or may also be marked by using an independent additional flag in the data unit.

For this type of data unit, the receiving end does not apply for retransmission, and instead this type of data unit is directly saved in the retransmission buffer of the receiving end (step 203). The retransmission is not performed, so a higher bit error rate of the transmitted data may occur, but a shorter delay may be achieved. Therefore, the data unit having the flag indicating that the retransmission is not needed is only used to carry high priority data and idle data.

203: Save the data unit in the retransmission buffer of the receiving end. It should be noted that, the saving the data unit in the retransmission buffer of the receiving end further includes: if the corresponding data unit is already saved in the retransmission buffer of the receiving end, that is, if the data unit needed to be saved is a retransmitted data unit, replacing the existing data unit in the buffer.

204: Judge whether the data unit is a new data unit, that is, judge whether the data unit is a new data unit or a retransmitted data unit. For example, the judgment may be performed according to an SID of the data unit; if the data unit is a new data unit, execute step 203, that is, save the data unit in the retransmission buffer of the receiving end; and if the data unit is a retransmitted data unit, execute step 205.

205: Judge whether the data unit is incorrect; if the data unit is incorrect, execute step 206; and if the data unit is not incorrect, execute step 207.

206: Discard the data unit.

207: Judge whether the data unit times out. For example, the judgment may be performed according to the SID of the data unit; if the data unit times out, execute step 206, that is, discard the data unit; and if the data unit does not time out, execute step 203, that is, save the data unit in the retransmission buffer of the receiving end.

Processing performed on the data unit in the retransmission buffer of the receiving end may be as follows.

Mark the data unit in the retransmission buffer of the receiving end with an additional flag through monitoring a delay status, where the additional flag indicates a processing manner after an upper layer receives the data unit. For example, the following methods may be adopted.

(1) Judge whether a data unit not corrected within a high-priority-service delay threshold value exists in the retransmission buffer of the receiving end.

If no data unit not corrected within the high-priority-service delay threshold value exists in the retransmission buffer of the receiving end, and when it is determined that a new data unit needs to be submitted to the upper layer and that the data unit is correct, the data unit is marked with an additional flag, for example Flag_C, indicating normality; and when it is determined that a new data unit needs to be submitted to the upper layer and that the data unit is incorrect, the data unit is marked with an additional flag, for example, Flag_H, indicating that high priority service data is retained and low priority service data is discarded.

If a data unit not corrected within the high-priority-service delay threshold value exists in the retransmission buffer of the receiving end, in one aspect, when it is determined that a new data unit needs to be submitted to the upper layer, the data unit is marked with an additional flag, for example, Flag_H, indicating that high priority service data is retained and low priority service data is discarded; and in another aspect, judgment is performed on the data unit not corrected within the high priority threshold value, and when it is determined that the data unit not corrected within the high-priority-service delay threshold value needs to be submitted, the data unit is marked with an additional flag, for example, Flag_L, indicating that the low priority service data is retained and the high priority service data is discarded.

(2) Submit the data unit to the upper layer, that is, submit from a retransmission layer to a TPS-TC layer, so that the upper layer processes the data unit according to an additional flag. A process may specifically be as follows:

When the data unit in the buffer is marked with the additional flag indicating normality, the data unit is moved out of the retransmission buffer of the receiving end and submitted to the upper layer.

When the data unit in the buffer is marked with the additional flag indicating that the high priority service data is retained and the low priority service data is discarded, the data unit is copied and submitted to the upper layer, that is, the data unit is still buffered in the retransmission buffer at this time (that is, the data unit is not moved out of the retransmission buffer of the receiving end). The data unit is the data unit not corrected within the high-priority-service delay threshold value, and the data unit may still be corrected by a retransmitted correct data unit before the delay of the data unit exceeds a low-priority-service delay threshold value.

When the data unit in the buffer is marked with the additional flag indicating that the low priority service data is retained and the high priority service data is discarded, the data unit is moved out of the retransmission buffer of the receiving end and submitted to the upper layer.

After the upper layer receives the submitted data unit, if the additional flag of the data unit is the additional flag, for example Flag_C, indicating normality, the upper layer retains all data, that is, the high priority data and the low priority data; if the additional flag of the data unit is not the additional flag indicating normality, the upper layer performs processing according to the indication of the additional flag and only retains either the high priority data or the low priority data. For example, if the additional flag is Flag_L, only the low priority data is retained, and the high priority data is discarded; and if the additional flag is Flag_H, only the high priority data is retained, and the low priority data is discarded.

The reason is as follows. Generally, when the delay of the data unit is greater than or equal to the high-priority-service delay threshold value, the data unit in the retransmission buffer of the receiving end begins to be submitted to the upper layer for processing. If at this time the data unit in the retransmission buffer of the receiving end is already corrected within preset time (that is, the high-priority-service delay threshold value) and the data unit is correct, it means that the data unit submitted to the upper layer is correct data, so all the data may be retained; while if the data unit in the retransmission buffer of the receiving end is not corrected within preset time (that is, the high-priority-service delay threshold value) and meanwhile the delay of the data unit in the retransmission buffer of the receiving end is greater than any delay threshold value (the high-priority-service delay threshold value or low-priority-service delay threshold value), the data unit is submitted to the upper layer twice. First submission is performed when the delay of the data unit exceeds the high-priority-service delay threshold value. As stated in the foregoing, the data unit in the retransmission buffer of the receiving end is not corrected within the preset time, so that in one aspect, the receiving end of the retransmission layer submits the data unit to the upper layer, and in the other aspect, a incorrect data unit and data units following the data unit are moved into an expanded storage area in the retransmission buffer of the receiving end, so as to provide the incorrect data unit with an opportunity of being corrected again. At this time the high priority data is not retransmitted even if the high priority data is incorrect, the low priority data may be retransmitted, and correct data may be obtained during second submission, so at this time the high priority data is retained and the low priority data is discarded. The second submission is performed when the delay of the data unit in the retransmission buffer of the receiving end is greater than or equal to the low priority service data delay threshold value. The high priority data is already retained during the first submission, so the high priority data does not need to be retained repetitively, and the high priority data unit is directly discarded. The low priority data is already retransmitted, so the data received at this time may be the retransmitted correct data, and the low priority data is retained. It should be noted that, the foregoing description is only an example, and it is not excluded that the submission may be defined to occur before the high-priority-service delay threshold value is exceeded or before the low-priority-service delay threshold value is exceeded. For example, the data unit is submitted once the data unit is saved in the retransmission buffer of the receiving end. For convenience of description, in the embodiment of the present invention, a new data unit needed to be submitted is submitted when the delay is greater than or equal to the high-priority-service delay threshold value, and a new uncorrected data unit needed to be submitted is submitted when the delay is greater than or equal to the low-priority-service delay threshold value. This is described in detail in subsequent embodiments and not repeatedly described here.

It should be noted that, the scheme of processing the data unit in the retransmission buffer of the receiving end provided in the embodiment of the present invention may also be used as an independent scheme, that is, the scheme in the prior art may still be used before the data unit is saved in a receiving end buffer unit. After the data unit is saved in the retransmission buffer of the receiving end, the data unit in the retransmission buffer of the receiving end is marked with the additional flag through monitoring the delay status, and then the data unit is submitted to the upper layer, that is, from the retransmission layer to the TPS-TC layer, so that the upper layer processes the data unit according to the additional flag. The additional flag indicates the processing manner after the upper layer receives the data unit. For specific implementation, reference may be made to the relevant description in this embodiment, and the details are not repeatedly described here.

It can be known from the foregoing that, in this embodiment, after the receiving end receives the data unit sent by the sending end, if the receiving end determines that the data unit includes the flag indicating that the retransmission is not needed, the receiving end does not need to judge whether the data unit is correct or whether the data unit needs to be retransmitted, and instead directly saves the data unit in the retransmission buffer of the receiving end. In this way, the number of retransmission applications of the receiving end and the delay of this type of data unit may be reduced. Furthermore, the receiving end may also mark the data unit in the retransmission buffer of the receiving end with the additional flag through monitoring the delay status, so as to instruct the upper layer to retain or discard the data of different priorities after the upper layer receives the data unit, so as to cooperate with the sending end to complete a data transmission process that may distinguish between service types. For example, for a service that is sensitive to the delay but has no requirement on the bit error rate, a lower INP protection level may be adopted, and retransmission is not performed after a certain delay is exceeded; and for a service that is insensitive to the delay but requires a low bit error rate, a higher INP protection level may be adopted, and retransmission needs to be performed, thus achieving the objective of satisfying different delay requirements of different services and different INP protection level requirements of different services, and improving the QoE of integrated services for a user.

Embodiment 3

The method according to Embodiment 1 and Embodiment 2 is further illustrated in detail in this embodiment through an example.

Figure 3:
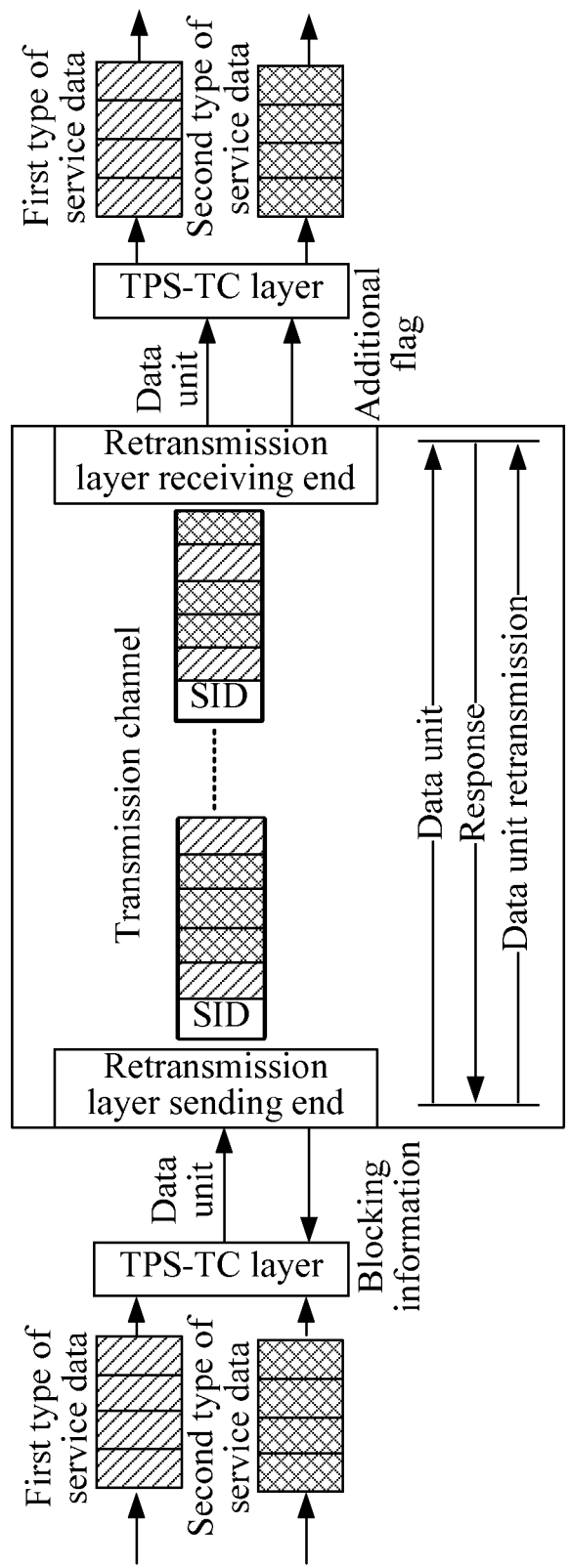
FIG. 3 is a schematic diagram of transmission of a method according to a third embodiment of the present invention.

First, various services may be classified into two main types according to different requirements of the services on a delay and a bit error rate. The first type of service is a service having a low requirement on the bit error rate and requiring a short delay, that is, a service, for example, a Voice over Internet Protocol (VoIP, Voice over IP), having a low requirement on an INP protection level but being sensitive to the delay. A priority of the first type of service may be set to a high priority. The second type of service is a service requiring a low bit error rate and having a low requirement on the delay and jitter, that is, a service, for example, a video service, having a high requirement on the INP protection level but being insensitive to the delay. A priority of the second type of service may be set to a low priority. Referring to FIG. 3, a transmission process may be as follows.

(1) Sending End

Figure 4:
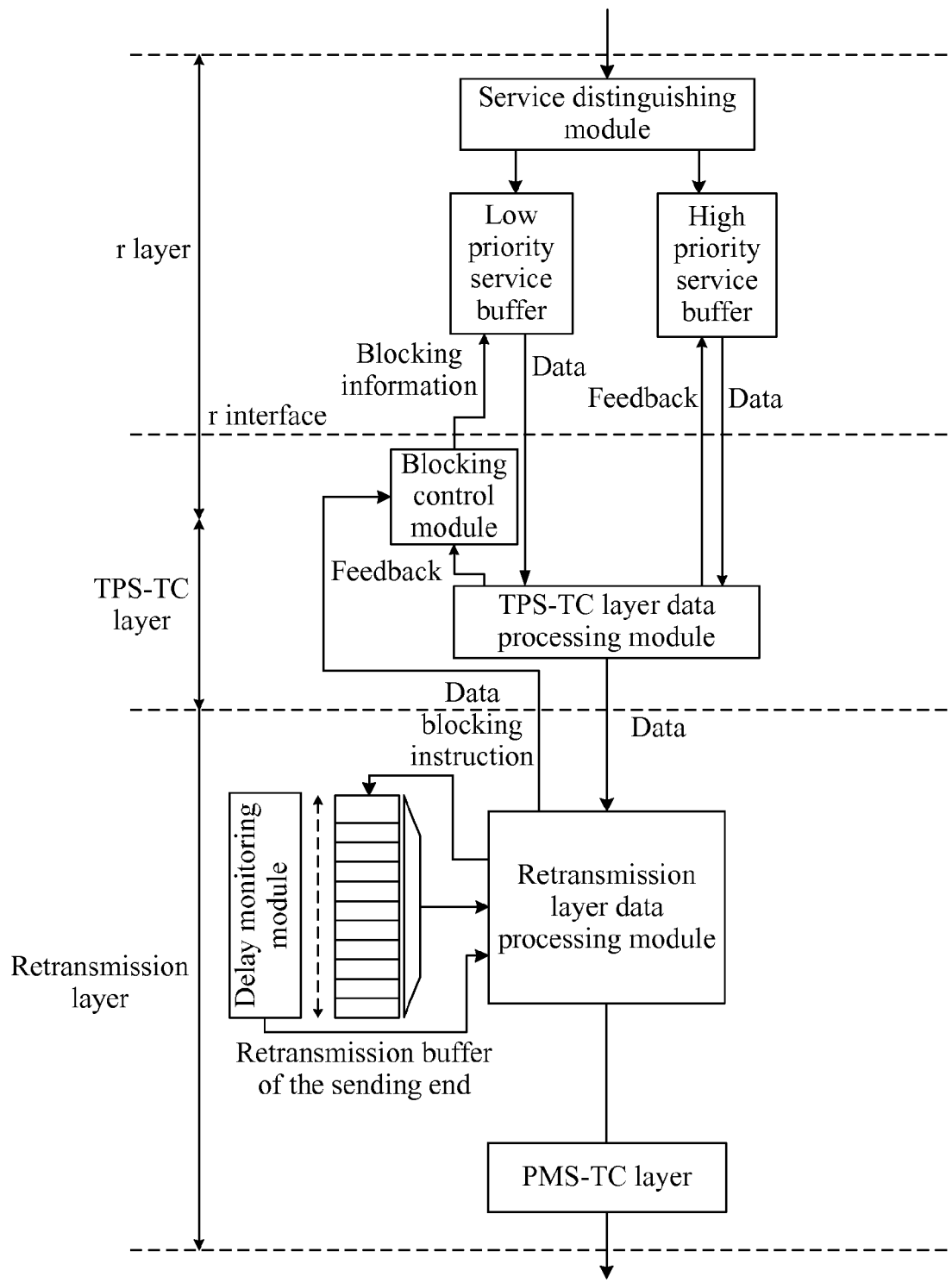
FIG. 4 is a schematic diagram of processing at a sending end in the method according to the third embodiment of the present invention.

Referring to FIG. 4, above a TPS-TC layer (that is, in an upper layer of the TPS-TC layer), a service distinguishing module saves services having different priorities in a low priority service buffer and a high priority service buffer respectively. Then, the services are input into the TPS-TC layer through different service interfaces. A TPS-TC layer data processing module encapsulates service data into a data unit and marks the data unit with an SID, and then a retransmission layer sending end sends the data unit to a retransmission layer receiving end. Meanwhile, in order that the data unit may be retransmitted when the receiving end does not receive the data unit correctly, the data unit also needs to be saved in a retransmission buffer of the sending end. During the transmission, the receiving end may return a response message indicating that the data unit is received successfully or unsuccessfully to the sending end. If the sending end receives a response message indicating that the data unit is received successfully, the corresponding data unit saved in the retransmission buffer of the sending end may be deleted. If the sending end receives a response message indicating that the data unit is received unsuccessfully, the corresponding data unit is extracted from the sending end buffer for retransmission. It should be noted that, the retransmission layer includes a PMS-TC layer. Furthermore, when data or information is transmitted among the layers, a receiver may also return a feedback message to a sender according to a specific receiving situation or processing situation.

During the transmission, a delay monitoring module of the retransmission layer sending end monitors a delay of data during transmission by monitoring a storage status of space in the retransmission buffer of the sending end. For example, the delay monitoring module determines whether an amount of data saved in the retransmission buffer of the sending end is greater than a preset threshold value, and if the amount of data saved in the retransmission buffer of the sending end is greater than the preset threshold value, it indicates that the delay is greater than a preset threshold value; and if the amount of data saved in the retransmission buffer of the sending end is not greater than the preset threshold value, it indicates that the delay is not greater than the preset threshold value. When the delay is smaller than or equal to the preset threshold value, the data is transmitted according to a normal process (referring to the foregoing description). When the delay is greater than the preset threshold value, the retransmission layer data processing module sends a data blocking instruction to a TPS-TC layer blocking control module. After receiving the data blocking instruction, the blocking control module sends blocking information to a low priority data interface on the upper layer. For example, the blocking control module sends the blocking information to a low priority r interface on an r layer in FIG. 4, that is, temporarily stops receiving low priority data, so as to prevent the transmitted data from being incorrect or lost because of data overflow occurred in the retransmission buffer of the sending end, thus achieving the objective of applying a higher INP protection level to the low priority data. However, for the purpose of reducing a delay of high priority data, the high priority data is not stopped from being received at this time, because the high priority data does not need the high INP protection level. After being received, the high priority data is encapsulated into a special data unit. The so-called special data unit refers to a data unit that is marked with a flag indicating that retransmission is not needed, not saved in a retransmission buffer of the receiving end, and instead directly sent to the receiving end. After receiving the special data unit, the receiving end does not apply for retransmission of this type of data unit. Certainly, data borne in the special data unit is not retransmitted, so a higher bit error rate of the transmitted data may occur, but from another point of view, a shorter delay may be achieved, and a short delay requirement of the high priority data having no requirement on the bit error rate is satisfied.

It should be noted that, for the purpose of further reducing the delay, the retransmission layer sending end and the retransmission layer receiving end do not distinguish between services. All service data is randomly stored in the data unit, that is, the retransmission layer still adopts a single delay channel manner to transmit data, and meanwhile, all data retransmission application and data transmission are still performed on the retransmission layer, and retransmission is not initiated above the TPS-TC layer. During the transmission, the retransmission layer monitors change of the delay of the data during the transmission on the retransmission layer and feeds back information about the change of the delay to the TPS-TC layer. The TPS-TC layer processes the services having different priorities according to the information about the change of the delay, where the information about the change of the delay is fed back by the retransmission layer. The information about the change of the delay, where the information about the change of the delay is fed back by the retransmission layer to the TPS-TC layer, includes the data blocking instruction sent by the sending end and receiving end data discard flag information.

Furthermore, it should be further noted that, if the space in the retransmission buffer of the sending end is restored to be sufficient (for example, when the delay of the data in the retransmission buffer of the sending end is smaller than the preset threshold value or equal to 0), the retransmission layer data processing module may send a data deblocking instruction to the TPS-TC layer blocking control module. After receiving the data deblocking instruction, the blocking control module stops sending the blocking information. Certainly, a timer may also be started when the blocking information is sent. After a preset period of time, the blocking information is stopped from being sent, so that a function of receiving the low priority service is restored to normal.

Figure 5:
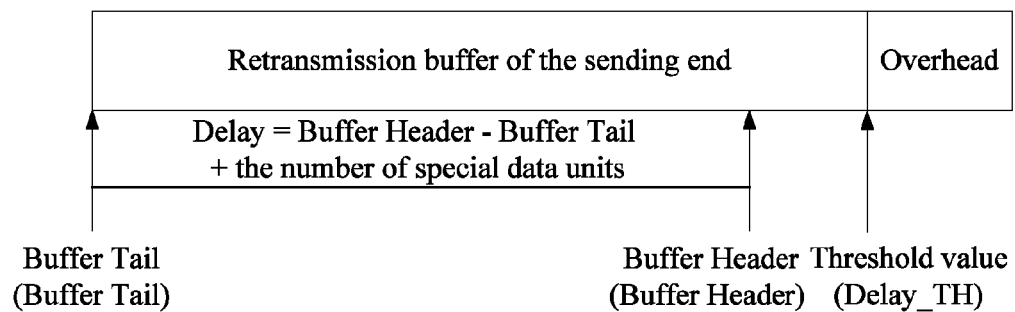
FIG. 5 is a schematic diagram of a retransmission buffer of the sending end in the method according to the third embodiment of the present invention.
Figure 6:
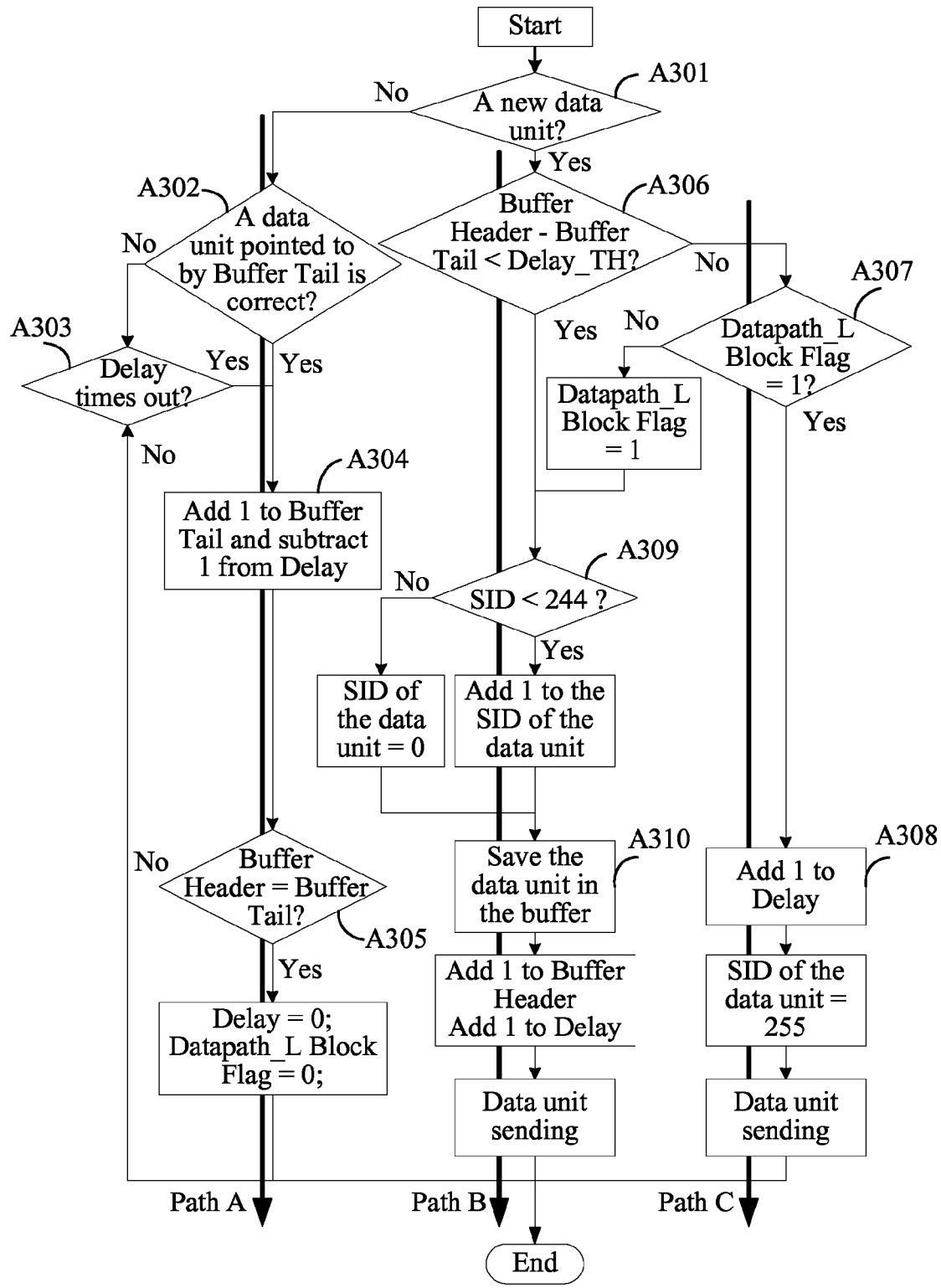
FIG. 6 is a flow chart of data unit processing at the sending end according to the third embodiment of the present invention.

Illustration is given below through an example. Referring to FIG. 5, it is assumed that a pointer header of a retransmission buffer of the sending end is Buffer Header, which points to a latest data unit, a pointer tail is Buffer Tail, which points to an earliest unacknowledged data unit, and a preset threshold value is Delay_TH, a delay of data at the sending end is equal to a value, obtained by subtracting the pointer tail from the pointer header, plus the number of special data units (Num_special DTU), that is, Delay=Buffer Header−Buffer Tail+Num_special DTU. Furthermore, a data threshold value Delay_TH at the sending end may be a value obtained by subtracting the delay at the receiving end from the delay required by the service. As shown in FIG. 6, a flow of data unit processing at the sending end may be as follows.

A301: Judge whether a data unit is a new data unit; if the data unit is not a new data unit, execute step A302; and if the data unit is a new data unit, execute step A306.

A302: Judge whether a data unit pointed to by Buffer Tail is correct; if the data unit pointed to by Buffer Tail is not correct, execute step A303; and if the data unit pointed to by Buffer Tail is correct, execute step A304.

A303: Judge whether Delay times out; if Delay does not time out, end the flow; and if Delay times out, execute step A304.

A304: Add 1 to both Buffer Tail and Delay, and then execute step A305.

A305: Judge whether Buffer Header is equal to Buffer Tail; if Buffer Header is not equal to Buffer Tail, end the flow; and if Buffer Header is equal to Buffer Tail, which indicates that no data unit exists in a sending end buffer and space is sufficient, set Delay to 0, set a flag (Datapath_L Block Flag) of a data blocking instruction to 0, and end the flow.

It should be noted that, in the embodiment of the present invention, when it is assumed that Datapath_L Block Flag is 0, it indicates that the data blocking instruction is invalid, that is, the blocking information is stopped from being sent; and when the Datapath_L Block Flag is 1, it indicates that the data blocking instruction is valid, that is, the blocking information is sent.

A306: Judge whether a difference between Buffer Header and Buffer Tail is greater than a preset threshold value Delay_TH; if the difference between Buffer Header and Buffer Tail is greater than the preset threshold value Delay_TH, execute step A307; and if the difference between Buffer Header and Buffer Tail is not greater than the preset threshold value Delay_TH, execute step A309.

A307: Judge whether Datapath_L Block Flag is set to 1; if Datapath_L Block Flag is set to 1, execute step A308; and if Datapath_L Block Flag is not set to 1, execute step A309 after setting Datapath_L Block Flag to 1.

A308: Add 1 to Delay, mark the data unit with an SID of 255, then send the data unit to the receiving end, and end the flow.

A309: Judge whether the SID of the data unit pointed to by Buffer Header is smaller than 244; if the SID of the data unit pointed to by Buffer Header is smaller than 244, add 1 to the SID of the data unit, and then execute step A310; and if the SID of the data unit pointed to by Buffer Header is not smaller than 244, execute step A310 after setting the SID of the data unit to 0.

It should be noted that, in the embodiment of the present invention, it is assumed that an SID of a common data unit, that is, a data unit that may be retransmitted, ranges from 0 to 244.

A310: Save the data unit in the retransmission buffer of the sending end, add 1 to both Buffer Header and Delay, then send the data unit to the receiving end, and end the flow.

In the flow, totally three paths, that is, a path A, a path B, and a path C, exist. Referring to FIG. 6, the path A is a flow of processing the data unit saved in the retransmission buffer of the sending end, where the flow includes processing operations of the receiving end acknowledging correct receiving, the delay timing out, and sending the deblocking instruction; path B is a flow of sending the common data unit (that is, the data unit that may be retransmitted); and the path C is a flow of sending the special data unit (for example, a data unit having an SID of 255), that is, the data unit including the flag indicating that the retransmission is not needed.

(2) Receiving End

Figure 7:
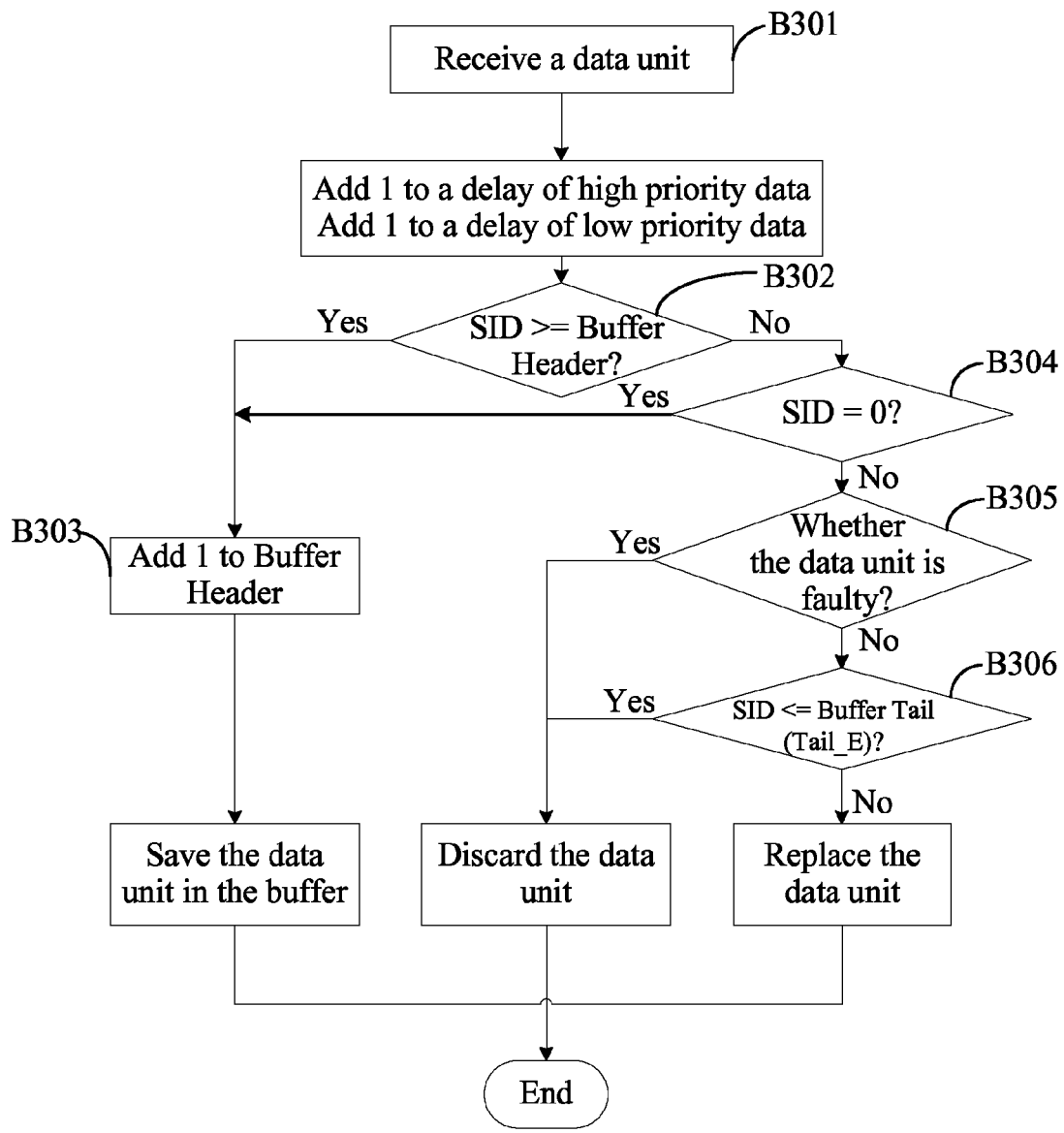
FIG. 7 is a flow chart of data unit processing at a receiving end according to the third embodiment of the present invention.

After a retransmission layer receiving end receives a data unit sent by a sending end, if the receiving end determines that the data unit is a special data unit, that is, determines that the data unit includes a flag indicating that retransmission is not needed, the receiving end does not need to judge whether the data unit is correct or whether the data unit needs to be retransmitted, and directly saves the data unit in a retransmission buffer of the receiving end. If the data unit is a common data unit, the receiving end needs to judge whether the data unit is correct or whether the data unit needs to be retransmitted, so as to determine whether the data unit is to be saved in the retransmission buffer of the receiving end or discarded. As shown in FIG. 7, a specific flow may be as follows. It should be noted that, in this flow, descriptions of Buffer Header and Buffer Tail, a delay Delay_H of high priority data, and a delay Delay_L of low priority data are involved. With regard to this, detailed illustration (referring to FIG. 9) is given in the subsequent description of this embodiment. For convenience of description, details are not repeatedly described here.

B301: Receive a data unit from a PMD-TC layer, add 1 to both the delay Delay_H of high priority data and the delay Delay_L of low priority data, and then execute step B302.

B302: Judge whether an SID of the received data unit is greater than an SID of a data unit pointed to by Buffer Header; if the SID of the received data unit is greater than the SID of the data unit pointed to by Buffer Header, execute step B303; if the SID of the received data unit is not greater than the SID of the data unit pointed to by Buffer Header, execute step B304.

B303: Add 1 to Buffer Header, then save the received data unit in the retransmission buffer of the receiving end, and end the flow.

If in step B301, the received data unit is a special data unit, for example the SID of the data unit is 255, then in step B302, it may surely be obtained that the SID of the data unit is greater than the SID of the data unit pointed to by Buffer Header (because the maximum SID of a common data unit is 244). Therefore, as long as step 302 is executed, an operation of determining whether the data unit includes the flag indicating that the retransmission is not needed may be performed at the same time. Certainly, if the special data unit uses another flag to indicate that the retransmission is not needed, a step of determining whether the data unit includes the flag indicating that the retransmission is not needed may be added before step B302. If the flag indicating that the retransmission is not needed is included, step B303 is executed; and if the flag indicating that the retransmission is not needed is not included, step B302 is executed.

B304: Judge whether the SID of the received data unit is 0, that is, whether a new cycle is entered (the SID repeats from 0 to 244, that is, if an SID of a previous data unit reaches the maximum value 244, an SID of a next new data unit is set to 0); if the SID of the received data unit is 0, execute step B303; and if the SID of the received data unit is not 0, execute step B305.

B305: Judge whether the received data unit is incorrect; if the received data unit is incorrect, discard the data unit; and if the received data unit is not incorrect, execute step B306.

B306: Judge whether the SID of the received data unit is smaller than or equal to Buffer Tail_E, that is, judge whether the data unit already times out; if the SID of the received data unit is smaller than or equal to Buffer Tail_E, discard the data unit, and end the flow; and if the SID of the received data unit is not smaller than or equal to Buffer Tail_E, which means that the data unit is a retransmitted and valid data unit, replace the corresponding data unit in the retransmission buffer of the receiving end, that is, update the corresponding data unit in the retransmission buffer of the receiving end, and end the flow.

Figure 8:
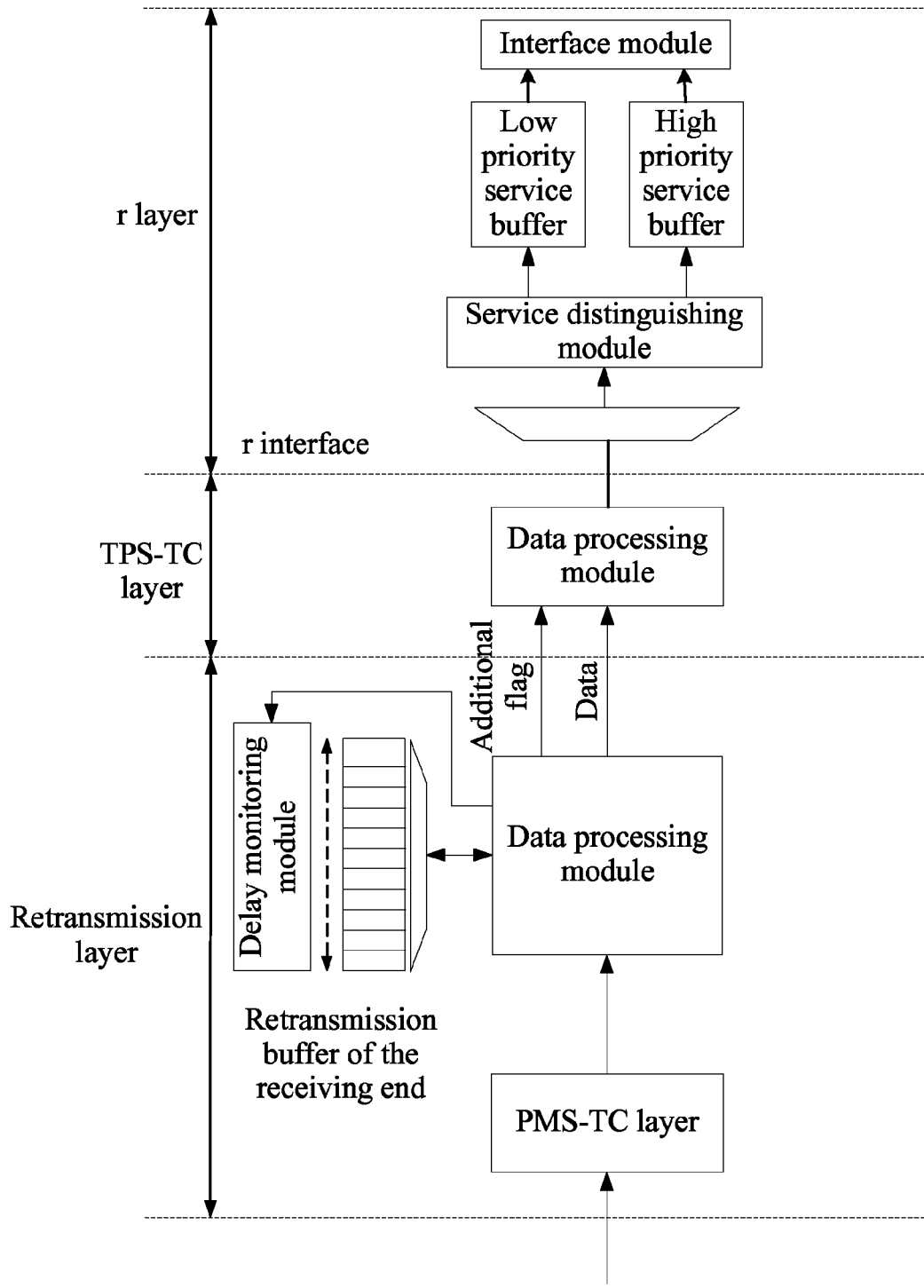
FIG. 8 is a schematic diagram of processing at the receiving end in the method according to the third embodiment of the present invention.

At the retransmission layer receiving end, as shown in FIG. 8, the retransmission layer delay monitoring module monitors a space occupation status of the retransmission buffer of the receiving end to instruct the retransmission layer data processing module to mark the data unit with a different additional flag, and then send additional flag information and the data unit together to the TPS-TC layer data processing module for processing. After the TPS-TC layer data processing module performs processing on the data unit according to the additional flag, a different service interface, for example, an r interface in FIG. 8, is used to submit the data unit to an upper r layer. A service distinguishing module classifies the data, and then saves the data in the low priority service buffer and the high priority service buffer according to priority tags respectively, so as to send the data to an interface module. It should be noted that, the retransmission layer includes a PMS-TC layer. Furthermore, when data or information is transmitted among the layers, a receiver may also return a feedback message to a sender according to a specific receiving situation or processing situation.

It should be noted that, a priority of data borne in the data unit is not identified on the retransmission layer, and instead different types of data units (that is, service data having different priorities) are processed above the retransmission layer according to the additional flag information marked on the retransmission layer. Therefore, the retransmission layer not only transmits the data unit to the TPS-TC layer, but also needs to transmit the additional flag of the data unit to the TPS-TC layer. If it is assumed that the additional flag is represented by Flag, Flag may be classified into three types: Flag_H, Flag_L, and Flag_C. After receiving the data unit and the additional flag, the TPS-TC layer performs different processing on the received data units according to the different additional flags. For example, if the additional flag of the data unit is Flag_H, the high priority data is retained, and the low priority data is discarded; if the additional flag of the data unit is Flag_L, the low priority data is retained, and the high priority data is discarded; and if the additional flag of the data unit is Flag_C, all the data is retained. For description of the additional flag, reference may be made to Embodiment 2, and the details are not repeatedly described here.

Illustration is further given below in detail through an example.

Figure 9:
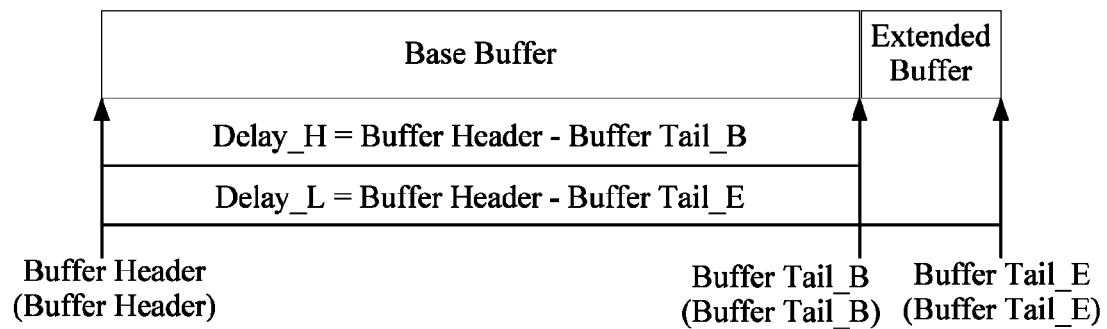
FIG. 9 is a schematic diagram of a retransmission buffer of the receiving end in the method according to the third embodiment of the present invention.
Figure 10:
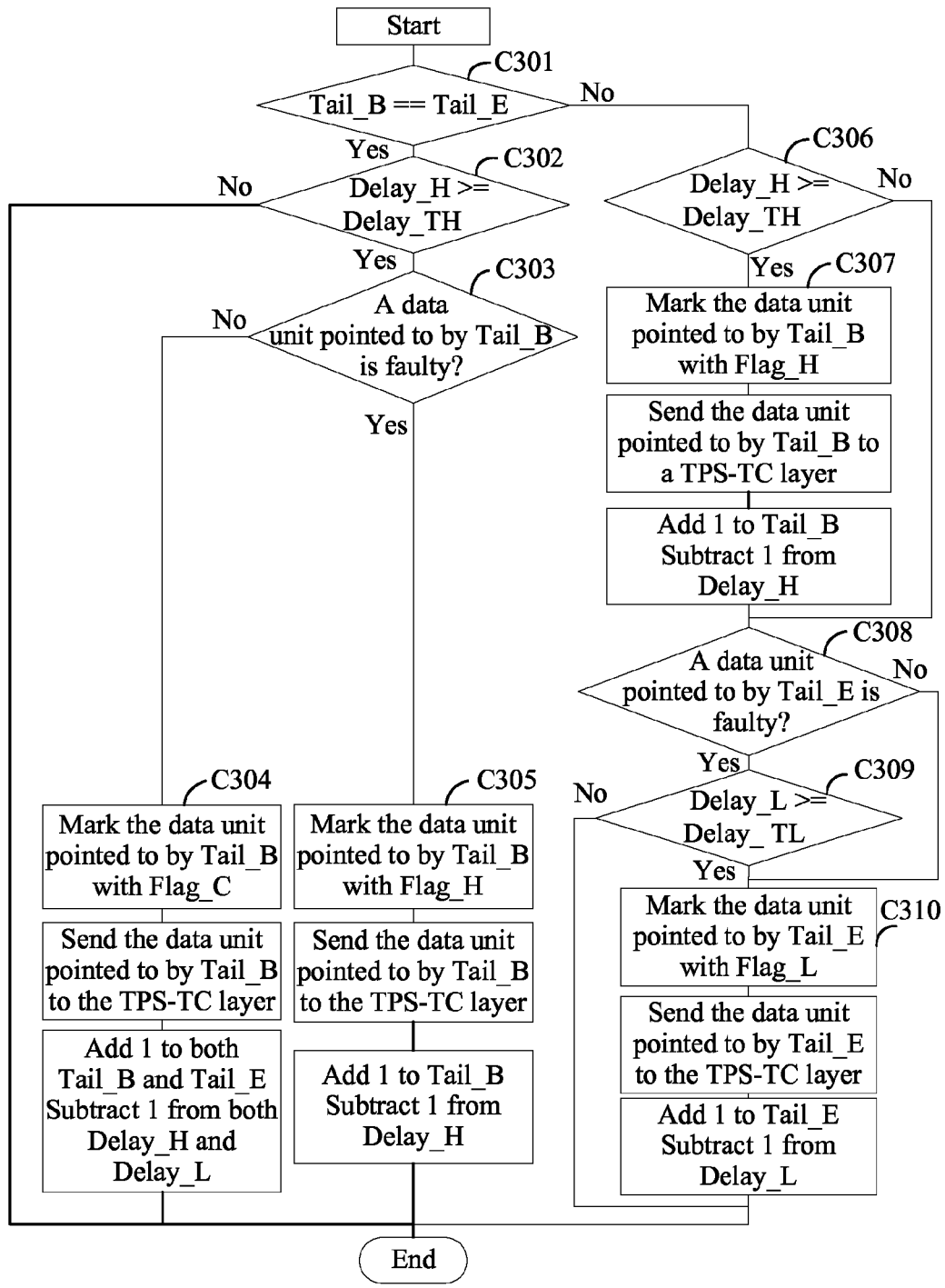
FIG. 10 is another flow chart of data unit processing at the receiving end according to the third embodiment of the present invention.

Referring to FIG. 9, it is assumed that the retransmission buffer of the receiving end is divided into two parts: a base buffer (Base Buffer) and an extended buffer (Extended Buffer). Furthermore, two delay threshold values, Delay_TH and Delay_TL, are set according to delay requirements of services of different priorities, where Delay_TH is set according to the delay requirement of high priority data and used to monitor a space occupation status of the Base Buffer, Delay_TL is set according to the delay requirement of low priority data and used to monitor a space occupation status of the Extended Buffer, and Delay_TH is smaller than Delay_TL. Accordingly, a pointer header and two pointer tails also exist in the retransmission buffer of the receiving end. Here, it is assumed that the pointer header is Buffer Header, the pointer tail corresponding to the Base Buffer is Buffer Tail_B, and the pointer tail corresponding to the Extended Buffer is Buffer Tail_E. In a normal situation, that is, in the situation that the data unit in the retransmission buffer of the receiving end is already corrected within a delay value of the high priority data, the two pointer tails Buffer Tail_B and Buffer Tail_E shall overlap each other. When a data unit not corrected within a high-priority-service delay threshold value Delay_H exists in the retransmission buffer of the receiving end, the uncorrected data unit is saved in the Extended Buffer, and at this time, the two pointer tails Buffer Tail_B and Buffer Tail_E are not equal. The pointer header points to a received latest data unit, and the pointer tail points to a received earliest data unit. The delay Delay_H of the high priority data should be equal to a difference between Buffer Header and Buffer Tail_B, and the delay Delay_L of the low priority data should be equal to a difference between Buffer Header and Buffer Tail_E. The receiving end performs, according to configurations of the pointer header and the pointer tails of the retransmission buffer of the receiving end and the two delay threshold values, different operations on different data and sets different additional flags for the data units. As shown in FIG. 10, a flow of data unit processing at the receiving end may be as follows.

C301: Judge whether the pointer tail Buffer Tail_B and pointer tail Buffer Tail_E are equal to each other; if the pointer tail Buffer Tail_B and pointer tail Buffer Tail_E are equal to each other, execute step C302; and if the pointer tail Buffer Tail_B and pointer tail Buffer Tail_E are not equal to each other, execute step C306.

It should be noted that, step C301 equivalently judges whether a data unit not corrected within a high-priority-service delay threshold value Delay_H exists in the retransmission buffer of the receiving end. If the data unit not corrected within the high-priority-service delay threshold value Delay_H exists in the retransmission buffer of the receiving end, the pointer tail Buffer Tail_B and pointer tail Buffer Tail_E are not equal to each other. If no data unit not corrected within the high-priority-service delay threshold value Delay_H exists in the retransmission buffer of the receiving end, the pointer tail Buffer Tail_B and pointer tail Buffer Tail_E are equal to each other.

C302: Judge whether there is a new data unit needed to be submitted to an upper layer; if there is a new data unit needed to be submitted to the upper layer, execute step C303; and if there is no new data unit needed to be submitted to the upper layer, end the flow. Specifically, it may be judged whether a delay Delay_H of high priority data is greater than Dealy_TH; if the delay Delay_H of the high priority data is not greater than Dealy_TH, which indicates that there is no new data unit needed to be submitted to the upper layer, end the flow; and if the delay Delay_H of the high priority data is greater than Dealy_TH, which indicates that there is a new data unit needed to be submitted to the upper layer, execute step C303.

C303: Judge whether the new data unit needed to be submitted to the upper layer is correct; if the new data unit needed to be submitted to the upper layer is correct, execute step C304; and if the new data unit needed to be submitted to the upper layer is not correct, execute step C305. Specifically, it may be judged whether a data unit pointed to by the pointer tail Buffer Tail_B is incorrect; if the data unit pointed to by the pointer tail Buffer Tail_B is not incorrect, which indicates that the new data unit needed to be submitted to the upper layer is correct, execute step C304; and if the data unit pointed to by the pointer tail Buffer Tail_B is incorrect, which indicates that the new data unit needed to be submitted to the upper layer is incorrect, execute step C305.

C304: Mark the new data unit needed to be submitted to the upper layer with Flag_C, that is, mark the data unit pointed to by the pointer tail Buffer Tail_B with Flag_C, submit the data unit to the upper layer, that is, a TPS-TC layer, then add 1 to both of the pointer tails Buffer Tail_B and Buffer Tail_E, subtract 1 from both Delay_H and Delay_L, and end the flow.

C305: Mark the new data unit needed to be submitted to the upper layer with Flag_H, that is, mark the data unit pointed to by the pointer tail Buffer Tail_B with Flag_H, submit the data unit to the upper layer, that is, the TPS-TC layer, then add 1 to the pointer tail Buffer Tail_B, subtract 1 from Delay_H, and end the flow.

C306: Judge whether there is a new data unit needed to be submitted to the upper layer; if there is a new data unit needed to be submitted to the upper layer, in one aspect, execute step C307, and in the other aspect, execute step C308; and if there is no new data unit needed to be submitted to the upper layer, execute step C308. Specifically, it may be judged whether the delay Delay_H of high priority data is greater than Dealy_TH; if the delay Delay_H of the high priority data is greater than Dealy_TH, which indicates that there is a new data unit needed to be submitted to the upper layer, in one aspect, execute step C307, and in the other aspect, execute step C308; and if the delay Delay_H of the high priority data is not greater than Dealy_TH, which indicates that there is no new data unit needed to be submitted to the upper layer, execute only step C308.

It should be noted that, the sequence of executing steps C307 and C308 is not limited.

C307: Mark the new data unit needed to be submitted to the upper layer with Flag_H, that is, mark the data unit pointed to by the pointer tail Buffer Tail_B with Flag_H, submit the data unit to the upper layer, that is, the TPS-TC layer, then add 1 to the pointer tail Buffer Tail_B, and subtract 1 from Delay_H. It should be noted that, the sequence of executing steps C307 and C308 is not limited.

C308: Judge whether an uncorrected data unit (that is, a data unit saved in the Extended Buffer) is correct; if the uncorrected data unit is correct, execute step C310; and if the uncorrected data unit is not correct, execute step C309. Specifically, it may be judged whether a data unit pointed to by the pointer tail Buffer Tail_E is incorrect; if the data unit pointed to by the pointer tail Buffer Tail_E is incorrect, which indicates that the uncorrected data unit is incorrect, execute step C309; and if the data unit pointed to by the pointer tail Buffer Tail_E is not incorrect, which indicates that the uncorrected data unit is correct, execute step C310.

C309: Judge whether the uncorrected data unit needs to be submitted to the upper layer; if the uncorrected data unit needs to be submitted to the upper layer, execute step C310; and if the uncorrected data unit does not need to be submitted to the upper layer, end the flow. Specifically, it may be judged whether a delay Delay_L of low priority data is greater than Dealy_TL; if the delay Delay_L of the low priority data is greater than Dealy_TL, which indicates that the uncorrected data unit needs to be submitted to the upper layer, execute step C310; and if the delay Delay_L of the low priority data is not greater than Dealy_TL, which indicates that the uncorrected data unit does not need to be submitted to the upper layer, end the flow.

C310: Mark the uncorrected data unit with Flag_L, that is, mark the data unit pointed to by the pointer tail Buffer Tail_E with Flag_L, submit the data unit to the upper layer, that is, the TPS-TC layer, then add 1 to the pointer tail Buffer Tail_E, subtract 1 from Delay_L, and end the flow.

After this, the TPS-TC layer retains or discards the data unit according to the additional flag.

It should be noted that, in the scheme described in the foregoing, the scheme related to processing performed on the data unit in the retransmission buffer of the receiving end may also be used as an independent scheme, that is, the objective of the embodiment of the present invention may also be achieved by only implementing the scheme described in steps C301 to C309.

It can be known from the foregoing that, in the embodiment of the present invention, the delay of the data during the transmission is monitored to determine whether to send the blocking information used to block the low priority data sent by the upper layer, so as to prevent the data overflow in the retransmission buffer of the sending end, thus achieving higher INP protection for the low priority data. Meanwhile, only the low priority data is blocked at this time, the sending end may also continue receiving the high priority data, and mark the high priority data with the flag indicating that the retransmission is not needed when encapsulating the high priority data, so that the receiving end does not need to judge whether the data unit is correct or whether the data unit needs to be retransmitted when receiving the high priority data, and instead directly saves the data unit in the retransmission buffer of the receiving end. In this way, the number of retransmission applications of the receiving end and the delay of this type of data unit may be reduced, thus ensuring the short delay requirement of the high priority data. Furthermore, the receiving end may also mark the data unit in the retransmission buffer of the receiving end with the additional flag through monitoring the delay status, so as to instruct the upper layer to retain or discard the data of different priorities after the upper layer receives the data unit, so as to cooperate with the sending end to complete a data transmission process that may distinguish between service types. For example, for a service that is sensitive to the delay but has no requirement on the bit error rate, a lower INP protection level may be adopted, and retransmission is not performed after a certain delay is exceeded; and for a service that is insensitive to the delay but requires a low bit error rate, a higher INP protection level may be adopted, and retransmission needs to be performed, thus achieving the objective of satisfying different delay requirements of different services and different INP protection level requirements of different services, and improving the QoE of integrated services for a user.

Embodiment 4

Figure 11:
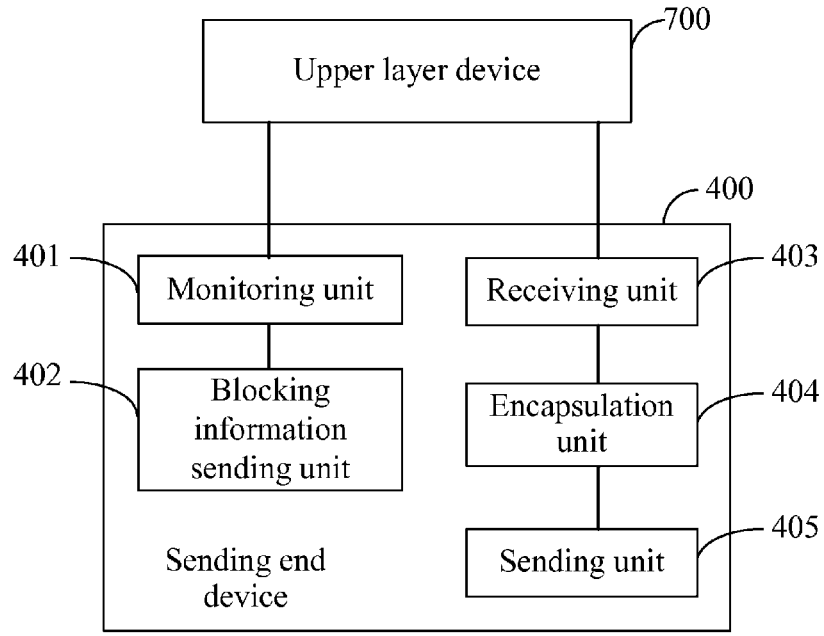
FIG. 11 is a schematic structural diagram of a sending end device according to an embodiment of the present invention.

Accordingly, in order to better implement the foregoing method, an embodiment of the present invention further provides a sending end 400. As shown in FIG. 11, the sending end device 400 includes a monitoring unit 401, a blocking information sending unit 402, a receiving unit 403, an encapsulation unit 404, and a sending unit 405. It should be noted that, for the purpose of better illustrating the relation between the units, FIG. 11 further provides an upper layer device 700.

The monitoring unit 401 is configured to monitor a delay of data during transmission. Specifically, the delay of the data during the transmission may be monitored through monitoring a storage status of space in a retransmission buffer of the sending end. For example, it is determined whether an amount of data saved in the retransmission buffer of the sending end is greater than a preset threshold value; if the amount of data saved in the retransmission buffer of the sending end is greater than the preset threshold value, it indicates that the delay is greater than a preset threshold value; and if the amount of data saved in the retransmission buffer of the sending end is not greater than the preset threshold value, it indicates that the delay is not greater than the preset threshold value.

The blocking information sending unit 402 is configured to send blocking information when the monitoring unit 401 determines that the delay is greater than a first delay threshold value (that is, in the embodiment of the present invention, a preset delay threshold value), where the blocking information is used to block low priority data sent by the upper layer device 700, and may specifically be a hardware blocking signal, blocking data, or a blocking flag. It should be noted that, a data priority may be preset by an operator. For example, if a service, such as a VoIP or a real-time video call, is sensitive to the delay but has no requirement on a bit error rate, service data of the service may be set to high priority data. If a service, such as a video service, is insensitive to the delay and requires a low bit error rate, service data of the service may be set to low priority data.

The receiving unit 403 is configured to receive the high priority data sent by the upper layer device 700.

The encapsulation unit 404 is configured to encapsulates the high priority data received by the receiving unit 403 into a data unit and mark the data unit with a flag indicating that the retransmission is not needed, where the flag indicating that the retransmission is not needed may specifically be a special SID, for example, 255, or may also be another SID negotiated by the sending end and a receiving end, or may also be marked by using an independent flag in the data unit.

The sending unit 405 is configured to send the data unit encapsulated by the encapsulation unit 404 to the receiving end.

The sending end device 400 may further include an idle data encapsulation unit.

The idle data encapsulation unit is configured to encapsulate idle data into a data unit and mark the data unit with a flag indicating that retransmission is not needed. It should be noted that, the idle data encapsulation unit and the encapsulation unit 404 may be the same entity.

In this case the sending unit 405 is further configured to send the data unit encapsulated by the idle data encapsulation unit to the receiving end.

For details of implementation of the foregoing units, reference may be made to the foregoing embodiments, and the details are not repeatedly described here.

It can be known from the foregoing that, in the embodiment of the present invention, through monitoring the delay of the data during the transmission by the monitoring unit 401, the sending end device 400 may determine whether to enable the blocking information sending unit 402 to send the blocking information used to block the low priority data to the upper layer device 700, so as to prevent the data overflow in a retransmission buffer of the sending end device 400, thus achieving higher INP protection for the low priority data. Meanwhile, only the low priority data is blocked at this time, therefore the receiving unit 403 of the sending end device 400 may still continue receiving the high priority data, and the encapsulation unit 404 marks the high priority data with the flag indicating that the retransmission is not needed when encapsulating the high priority data, so that the receiving end does not apply for the retransmission of the high priority data when receiving the high priority data, thus ensuring the short delay requirement of the high priority data. That is to say, by using the embodiment of the present invention, different delay requirements of different services and different INP protection level requirements of different services may be satisfied, and the QoE of integrated services for a user is improved. For example, for the service that is sensitive to the delay but has no requirement on the bit error rate, a lower INP protection level may be adopted, and the retransmission is not performed when the delay exceeds a certain delay threshold value; for the service that is insensitive to the delay but requires the low bit error rate, a higher INP protection level may be adopted, and the retransmission is needed.

Embodiment 5

Figure 12:
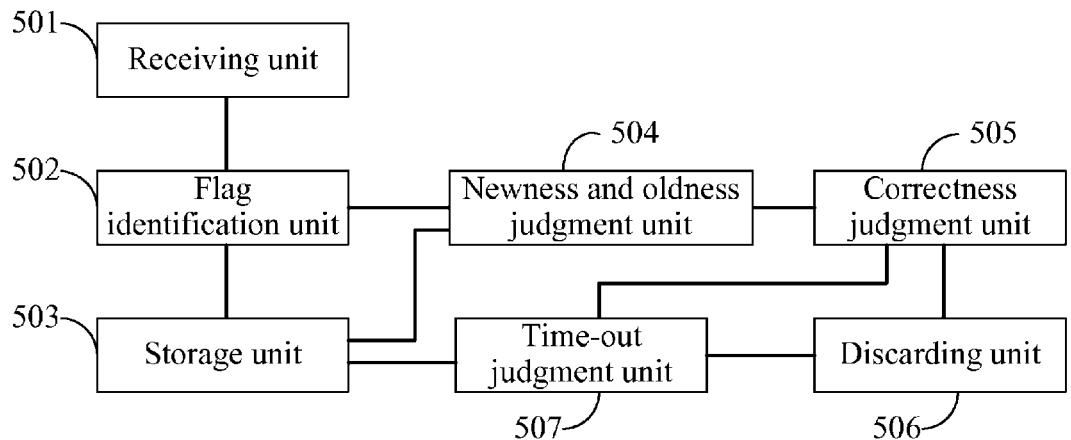
FIG. 12 is a schematic structural diagram of a receiving end device according to an embodiment of the present invention.

Accordingly, an embodiment of the present invention further provides a receiving end device. As shown in FIG. 12, the receiving end device includes a receiving unit 501, a flag identification unit 502, and a storage unit 503.

The receiving unit 501 is configured to receive a data unit sent by a sending end.

The flag identification unit 502 is configured to determine whether the data unit received by the receiving unit 501 includes a flag indicating that retransmission is not needed.

The storage unit 503 is configured to save the data unit in a retransmission buffer of the receiving end when the flag identification unit 502 determines that the data unit includes the flag indicating that the retransmission is not needed. The flag indicating that the retransmission is not needed may specifically be a special SID, for example, 255, or may also be another SID negotiated by the sending end and the receiving end, or may also be marked by using an independent additional flag in the data unit.

As shown in FIG. 12, the receiving end device may further include a newness and oldness judgment unit 504, a correctness judgment unit 505, a discarding unit 506, and a time-out judgment unit 507.

The newness and oldness judgment unit 504 is configured to judge whether the data unit is a new data unit, that is, judge whether the data unit is a new data unit or a retransmitted data unit when the flag identification unit 502 determines that the data unit does not include the flag indicating that the retransmission is not needed. For example, the judgment may be performed according to an SID of the data unit.

The storage unit 503 is configured to save the data unit in the retransmission buffer of the receiving end when the newness and oldness judgment unit 504 judges that the data unit is the new data unit, or save the data unit in the retransmission buffer of the receiving end when the time-out judgment unit 507 judges that the data unit does no time out.

The correctness judgment unit 505 is configured to judge whether the data unit is incorrect when the newness and oldness judgment unit 504 judges that the data unit is not a new data unit.

The discarding unit 506 is configured to discard the data unit when the correctness judgment unit 505 judges that the data unit is incorrect, or discard the data unit when the time-out judgment unit 507 judges that the data unit times out.

The time-out judgment unit 507 is configured to judge whether the data unit times out when the correctness judgment unit 505 judges that the data unit is not incorrect.

The receiving end device may further include an additional flag unit and a submission unit.

The additional flag unit is configured to mark the data unit in the retransmission buffer of the receiving end with an additional flag through monitoring a delay status, where the additional flag indicates a processing manner after the upper layer receives the data unit. For example:

It may be judged whether a data unit not corrected within a high-priority-service delay threshold value exists in the retransmission buffer of the receiving end.

If no data unit not corrected within the high-priority-service delay threshold value exists in the retransmission buffer of the receiving end, when it is determined that there is a new data unit needed to be submitted to the upper layer and that the data unit is correct, the data unit is marked with an additional flag, for example Flag_C, indicating normality; and when it is determined that there is a new data unit needed to be submitted to the upper layer and that the data unit is incorrect, the data unit is marked with an additional flag, for example Flag_H, indicating that high priority service data is retained and low priority service data is discarded.

If a data unit not corrected within the high-priority-service delay threshold value exists in the retransmission buffer of the receiving end, in one aspect, when it is determined that there is a new data unit needed to be submitted to the upper layer, the data unit is marked with an additional flag, for example, Flag_H, indicating that the high priority service data is retained and the low priority service data is discarded; and in the other aspect, judgment is performed on the data unit not corrected within the high priority threshold value, and when it is determined that the data unit not corrected within the high-priority-service delay threshold value needs to be submitted, the data unit is marked with an additional flag, for example, Flag_L, indicating that the low priority service data is retained and the high priority service data is discarded.

For details, reference may be made to the foregoing embodiments, and the details are not repeatedly described here.

The submission unit is configured to submit the data unit marked by the additional flag unit to the upper layer, so that the upper layer processes the data unit according to the additional flag. For example, when the data unit in the buffer is marked with the additional flag indicating normality, the data unit is moved out of the retransmission buffer of the receiving end and submitted to the upper layer; when the data unit in the buffer is marked with the additional flag indicating that the high priority service data is retained and the low priority service data is discarded, the data unit is copied and submitted to the upper layer, that is, the data unit is still buffered in the retransmission buffer at this time (that is, the data unit is not moved out of the retransmission buffer of the receiving end). The data unit is the data unit not corrected within the high-priority-service delay threshold value, and the data unit may still be corrected by a retransmitted correct data unit before the delay of the data unit exceeds the low-priority-service delay threshold value; and when the data unit in the buffer is marked with the additional flag indicating that the low priority service data is retained and the high priority service data is discarded, the data unit is moved out of the retransmission buffer of the receiving end and submitted to the upper layer.

After the upper layer receives the submitted data unit, if the additional flag of the data unit is the additional flag, for example Flag_C, indicating normality, the upper layer retains all data, that is, the high priority data and the low priority data; if the additional flag of the data unit is not the additional flag indicating normality, the upper layer perform processing according to indication of the additional flag and only retains either the high priority data or the low priority data. For example, if the additional flag is Flag_L, only the low priority data is retained, and the high priority data is discarded; and if the additional flag is Flag_H, only the high priority data is retained, and the low priority data is discarded.

It should be noted that, an embodiment of the present invention further provides another receiving end device, including an additional flag unit and a submission unit.

The additional flag unit is configured to mark the data unit in the retransmission buffer of the receiving end with an additional flag through monitoring a delay status, where the additional flag indicates a processing manner after the upper layer receives the data unit.

The submission unit is configured to submit the data unit marked by the additional flag unit to the upper layer, so that the upper layer processes the data unit according to the additional flag.

That is to say, only the receiving end device in the prior art is improved, and the sending end device in the prior art continues to be used.

For details of implementation of the foregoing units, reference may be made to the foregoing embodiments, and the details are not repeatedly described here.

It can be known from the foregoing that, in this embodiment, after the receiving unit 501 of the receiving end device receives the data unit sent by the sending end device, if the flag identification unit 502 determines that the data unit includes the flag indicating that the retransmission is not needed, the receiving end device does not need to judge whether the data unit is correct or whether the data unit needs to be retransmitted, and instead the storage unit 503 directly saves the data unit in the retransmission buffer of the receiving end. In this way, the number of retransmission applications of the receiving end device and the delay of this type of data unit may be reduced. Furthermore, the additional flag unit of the receiving end device may also mark the data unit in the retransmission buffer of the receiving end with the additional flag through monitoring the delay status, so as to instruct the upper layer to retain or discard the data of different priorities after the upper layer receives the data unit, so as to cooperate with the sending end device to complete a data transmission process that may distinguish between service types. For example, for a service that is sensitive to the delay but has no requirement on the bit error rate, a lower INP protection level may be adopted, and retransmission is not performed after a certain delay is exceeded; and for a service that is insensitive to the delay but requires a low bit error rate, a higher INP protection level may be adopted, and retransmission needs to be performed, thus achieving the objective of satisfying different delay requirements of different services and different INP protection level requirements of different services, and improving the QoE of integrated services for a user.

Embodiment 6

Figure 13:
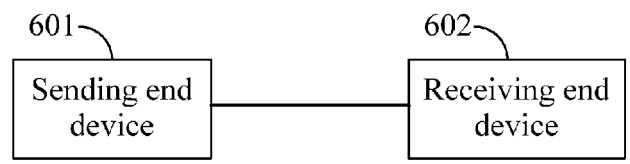
FIG. 13 is a schematic structural diagram of a communication system according to an embodiment of the present invention.

Accordingly, an embodiment of the present invention further provides a communication system. As shown in FIG. 13, the communication system includes any one of sending end devices 601 provided by the embodiments of the present invention and any one of receiving end devices 602 provided by the embodiments of the present invention.

The sending end device 601 is configured to monitor a delay of data during transmission, send blocking information used to block low priority data sent by an upper layer if the delay is greater than a first delay threshold value (that is, in the embodiment of the present invention, a preset delay threshold value), receive high priority data sent by the upper layer, encapsulate the high priority data into a data unit, mark the data unit with a flag indicating that retransmission is not needed, and send the data unit to the receiving end device 602, where the blocking information may specifically be a hardware blocking signal, blocking data, or a blocking flag.

The receiving end device 602 is configured to receive the data unit sent by the sending end device 601, and save the data unit in a retransmission buffer of the receiving end when it is determined that the data unit includes the flag indicating that the retransmission is not needed.

The receiving end device 602 is further configured to mark the data unit in the retransmission buffer of the receiving end with an additional flag through monitoring a delay status, where the additional flag indicates a processing manner after the upper layer receives the data unit, and submit the data unit to the upper layer, so that the upper layer processes the data unit according to the additional flag. For details, reference may be made to the foregoing embodiments, and the details are not repeatedly described here.

The sending end device 601 may include a monitoring unit 401, a blocking information sending unit 402, a receiving unit 403, an encapsulation unit 404, and a sending unit 405. The sending end device 601 may further include an idle data encapsulation unit.

The receiving end device 602 may include a receiving unit 501, a flag identification unit 502, and a storage unit 503. The receiving end device 602 may further include a newness and oldness judgment unit 504, a correctness judgment unit 505, a discarding unit 506, and a time-out judgment unit 507. Furthermore, the receiving end device 602 may further include an additional flag unit and a submission unit.

For details of implementation of the foregoing units, reference may be made to the foregoing embodiments, and the details are not repeatedly described here.

To sum up, it can be known from the foregoing that, in the embodiments of the present invention, the sending end device 601 may determine whether to send the blocking information used to block the low priority data sent by the upper layer through monitoring the delay of the data during the transmission, so as to prevent the data overflow in the retransmission buffer of the sending end, thus achieving higher INP protection for the low priority data. Meanwhile, only the low priority data is blocked at this time, the sending end device 601 may still continue receiving the high priority data, and mark the high priority data with the flag indicating that the retransmission is not needed when encapsulating the high priority data, so that the receiving end device 602 does not need to judge whether the data unit is correct or whether the data unit needs to be retransmitted when receiving the high priority data, and instead directly saves the data unit in the retransmission buffer of the receiving end. In this way, the number of retransmission applications of the receiving end and the delay of this type of data unit may be reduced, thus ensuring the short delay requirement of the high priority data. Furthermore, the receiving end device 602 may also mark the data unit in the retransmission buffer of the receiving end with the additional flag through monitoring the delay status, so as to instruct the upper layer to retain or discard the data of different priorities after the upper layer receives the data unit, so as to cooperate with the sending end device 601 to complete a data transmission process that may distinguish between service types. For example, for a service that is sensitive to the delay but has no requirement on the bit error rate, a lower INP protection level may be adopted, and retransmission is not performed after a certain delay is exceeded; and for a service that is insensitive to the delay but requires a low bit error rate, a higher INP protection level may be adopted, and retransmission needs to be performed, thus achieving the objective of satisfying different delay requirements of different services and different INP protection level requirements of different services, and improving the QoE of integrated services for a user.

Persons of ordinary skill in the art may understand that all or part of the steps of the methods in the foregoing embodiments may be implemented by a program instructing relevant hardware. The program may be stored in a computer readable storage medium, including a read only memory (ROM, Read Only Memory), a random access memory (RAM, Random Access Memory), a magnetic disk, or an optical disk.

The method and the apparatus for transmitting data and the communication system are illustrated in detail in the embodiments of the present invention above. The principles and implementations of the present invention are described here by using specific examples. The description about the preceding embodiments is merely used to help understand the method and core ideas of the present invention. Meanwhile, persons of ordinary skill in the art may make variations and modifications to the present invention in terms of the specific implementations and application scopes according to the ideas of the present invention. Therefore, the specification shall not be construed as a limit to the present invention.

What is claimed is:

1. A method for transmitting data, comprising: receiving at a receiver a data unit sent by a sending end; when it is determined that the data unit comprises a flag indicating that a retransmission is not needed, saving the data unit in a retransmission buffer of the receiving end; when it is determined that the data unit does not comprise the flag indicating that the retransmission is not needed, judging whether the data unit is a new data unit; if the data unit is the new data unit, saving the data unit in the retransmission buffer of the receiving end; and if the data unit is not the new data unit, judging whether the data unit is incorrect; if the data unit is incorrect, discarding the data unit; if the data unit is not incorrect, further judging whether the data unit times out; if the data unit times out, discarding the data unit; and if the data unit does not time out, saving the data unit in the retransmission buffer of the receiving end; marking the data unit in the retransmission buffer of the receiving end with an additional flag through monitoring a delay status, wherein the additional flag indicates a processing manner after an upper layer receives the data unit; and submitting the data unit to the upper layer, so that the upper layer processes the data unit according to the additional flag.

2. The method according to claim 1, wherein the marking the data unit in the retransmission buffer of the receiving end with the additional flag through monitoring the delay status comprises: judging whether a data unit not corrected within a high-priority-service delay threshold value exists in the receiving end buffer; if the data unit not corrected within the high-priority-service delay threshold value exists in the receiving end buffer, and when it is determined that there is a new data unit needed to be submitted to the upper layer and that the data unit is correct, marking the data unit with an additional flag indicating normality; and when it is determined that there is a new data unit needed to be submitted to the upper layer and that the data unit is incorrect, marking the data unit with an additional flag indicating that high priority service data is retained and low priority service data is discarded; and if the data unit not corrected within the high-priority-service delay threshold value exists in the receiving end buffer, in one aspect, when it is determined that there is a new data unit needed to be submitted to the upper layer, marking the data unit with the additional flag indicating that the high priority service data is retained and the low priority service data is discarded; and in the other aspect, performing judgment on the data unit not corrected within the high priority threshold value, and when it is determined that the data unit not corrected within the high-priority-service delay threshold value needs to be submitted, marking the data unit with an additional flag indicating that the low priority service data is retained and the high priority service data is discarded.

3. The method according to claim 2, wherein the submitting the data unit to the upper layer comprises:
when the data unit in the buffer is marked with the additional flag indicating normality, moving the data unit out of the retransmission buffer of the receiving end and submitting the data unit to the upper layer;
when the data unit in the buffer is marked with the additional flag indicating that the high priority service data is retained and the low priority service data is discarded, copying the data unit and submitting the data unit to the upper layer; and
when the data unit in the buffer is marked with the additional flag indicating that the low priority service data is retained and the high priority service data is discarded, moving the data unit out of the retransmission buffer of the receiving end and submitting the data unit to the upper layer.

4. A communication system, comprising: a sending end device, configured to monitor a delay of data during transmission; if the delay is greater than a first delay threshold value, send blocking information used to block low priority data sent by an upper layer; receive high priority data sent by the upper layer; encapsulate the high priority data into a data unit; mark the data unit with a flag indicating that a retransmission is not needed; and send the data unit to a receiving end device; and the receiving end device, configured to receive the data unit sent by the sending end device; when it is determined that the data unit comprises the flag indicating that the retransmission is not needed, save the data unit in a retransmission buffer of the receiving end; when it is determined that the data unit does not comprise the flag indicating that the retransmission is not needed, judge whether the data unit is a new data unit; if the data unit is the new data unit, save the data unit in the retransmission buffer of the receiving end; if the data unit is not the new data unit, judge whether the data unit is incorrect; if the data unit is incorrect, discard the data unit; if the data unit is not incorrect, further judge whether the data unit times out; if the data unit times out, discard the data unit; if the data unit does not time out, save the data unit in the retransmission buffer of the receiving end; mark the data unit in the retransmission buffer of the receiving end with an additional flag through monitoring a delay status, wherein the additional flag indicates a processing manner after the upper layer receives the data unit; and submit the data unit to the upper layer, so that the upper layer processes the data unit according to the additional flag.

5. The communication system according to claim 4, wherein the receiving end device is further configured to: judge whether a data unit not corrected within a high-priority-service delay threshold value exists in the receiving end buffer; if the data unit not corrected within the high-priority-service delay threshold value exists in the receiving end buffer, and when it is determined that there is a new data unit needed to be submitted to the upper layer and that the data unit is correct, mark the data unit with an additional flag indicating normality; and when it is determined that there is a new data unit needed to be submitted to the upper layer and that the data unit is incorrect, mark the data unit with an additional flag indicating that high priority service data is retained and low priority service data is discarded; and if the data unit not corrected within the high-priority-service delay threshold value exists in the receiving end buffer, in one aspect, when it is determined that there is a new data unit needed to be submitted to the upper layer, mark the data unit with the additional flag indicating that the high priority service data is retained and the low priority service data is discarded; and in the other aspect, when it is determined that there is not a new data unit needed to be submitted to the upper layer, perform judgment on the data unit not corrected within the high priority threshold value, and when it is determined that the data unit not corrected within the high-priority-service delay threshold value needs to be submitted, mark the data unit with an additional flag indicating that the low priority service data is retained and the high priority service data is discarded.

6. The communication system according to claim 5, wherein the receiving end device is further configured to: when the data unit in the buffer is marked with the additional flag indicating normality, move the data unit out of the retransmission buffer of the receiving end and submit the data unit to the upper layer; when the data unit in the buffer is marked with the additional flag indicating that the high priority service data is retained and the low priority service data is discarded, copy the data unit and submit the data unit to the upper layer; and when the data unit in the buffer is marked with the additional flag indicating that the low priority service data is retained and the high priority service data is discarded, move the data unit out of the retransmission buffer of the receiving end and submit the data unit to the upper layer.

7. A receiving end device, comprising: a receiving unit, configured to receive a data unit sent by a sending end; a flag identification unit, configured to determine whether the data unit received by the receiving unit comprises a flag indicating that a retransmission is not needed; a newness and oldness judgment unit, configured to judge whether the data unit is a new data unit when the flag identification unit determines that the data unit does not comprise the flag indicating that the retransmission is not needed; a storage unit, configured to save the data unit in a retransmission buffer of the receiving end when the flag identification unit determines that the data unit comprises the flag indicating that the retransmission is not needed, or when the newness and oldness judgment unit judges that the data unit is a new data unit; a correctness judgment unit, configured to judge whether the data unit is incorrect when the newness and oldness judgment unit judges that the data unit is not a new data unit; a time-out judgment unit, configured to judge whether the data unit times out when the correctness judgment unit judges that the data unit is not incorrect; and a discarding unit, configured to discard the data unit when the correctness judgment unit judges that the data unit is incorrect; or discard the data unit when the time-out judgment unit judges that the data unit times out; an additional flag unit, configured to mark the data unit in the retransmission buffer of the receiving end with an additional flag through monitoring a delay status, wherein the additional flag indicates a processing manner after an upper layer receives the data unit; and a submission unit, configured to submit the data unit marked by the additional flag unit to the upper layer, so that the upper layer processes the data unit according to the additional flag.

8. The receiving end device according to claim 7, wherein the additional flag unit is further configured to: judge whether a data unit not corrected within a high-priority-service delay threshold value exists in the receiving end buffer; if the data unit not corrected within the high-priority-service delay threshold value exists in the receiving end buffer, and when it is determined that there is a new data unit needed to be submitted to the upper layer and that the data unit is correct, mark the data unit with an additional flag indicating normality; and when it is determined that there is a new data unit needed to be submitted to the upper layer and that the data unit is incorrect, mark the data unit with an additional flag indicating that high priority service data is retained and low priority service data is discarded; and if the data unit not corrected within the high-priority-service delay threshold value exists in the receiving end buffer, in one aspect, when it is determined that there is a new data unit needed to be submitted to the upper layer, mark the data unit with the additional flag indicating that the high priority service data is retained and the low priority service data is discarded; and in the other aspect, when it is determined that there is not a new data unit needed to be submitted to the upper layer, perform judgment on the data unit not corrected within the high priority threshold value, and when it is determined that the data unit not corrected within the high-priority-service delay threshold value needs to be submitted, mark the data unit with an additional flag indicating that the low priority service data is retained and the high priority service data is discarded.

9. The receiving end device according to claim 8, wherein the submitting unit is further configured to: when the data unit in the buffer is marked with the additional flag indicating normality, move the data unit out of the retransmission buffer of the receiving end and submitting the data unit to the upper layer; when the data unit in the buffer is marked with the additional flag indicating that the high priority service data is retained and the low priority service data is discarded, copy the data unit and submit the data unit to the upper layer; and when the data unit in the buffer is marked with the additional flag indicating that the low priority service data is retained and the high priority service data is discarded, move the data unit out of the retransmission buffer of the receiving end and submit the data unit to the upper layer.

* * * * *